US006647063B1

(12) United States Patent
Oikawa

(10) Patent No.: US 6,647,063 B1
(45) Date of Patent: Nov. 11, 2003

(54) INFORMATION ENCODING METHOD AND APPARATUS, INFORMATION DECODING METHOD AND APPARATUS AND RECORDING MEDIUM

(75) Inventor: Yoshiaki Oikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/506,726

(22) Filed: Jul. 26, 1995

(30) Foreign Application Priority Data

Jul. 27, 1994 (JP) .......................................... 06-175531

(51) Int. Cl.[7] ............................ H04B 14/04; H04L 7/00
(52) U.S. Cl. ........................................ 375/242; 375/354
(58) Field of Search ................................ 375/342, 240, 375/242, 122, 245, 25, 354, 355; 370/79; 358/133, 141

(56) References Cited

U.S. PATENT DOCUMENTS

| | | | | |
|---|---|---|---|---|
| 3,349,183 A | | 10/1967 | Campanella | |
| 4,184,049 A | | 1/1980 | Crochiere et al. | 179/1 SA |
| 4,516,241 A | | 5/1985 | Farah et al. | 370/110.1 |
| 4,535,472 A | | 8/1985 | Tomcik | 381/31 |
| 4,569,058 A | | 2/1986 | Grallert | 375/27 |
| 4,573,187 A | | 2/1986 | Bui et al. | 381/43 |
| 4,622,598 A | | 11/1986 | Doi et al. | 360/22 |
| 4,625,286 A | | 11/1986 | Papamichalis et al. | 364/513.5 |
| 4,633,483 A | * | 12/1986 | Takahashi et al. | 375/25 |
| 4,697,212 A | | 9/1987 | Osawa et al. | 360/48 |
| 4,703,477 A | * | 10/1987 | Adelmann et al. | 370/94 |
| 4,706,265 A | | 11/1987 | Furukawa | 375/122 |
| 4,713,776 A | | 12/1987 | Araseki | 364/513.5 |
| 4,748,579 A | | 5/1988 | Zibman et al. | 364/736 |
| 4,873,589 A | | 10/1989 | Inazawa et al. | 360/53 |
| 4,882,754 A | | 11/1989 | Weaver et al. | 381/35 |
| 4,885,790 A | | 12/1989 | McAulay et al. | 381/36 |

(List continued on next page.)

FOREIGN PATENT DOCUMENTS

| | | | |
|---|---|---|---|
| EP | 0 349 325 A2 | 1/1990 | G11B/20/10 |
| EP | 0 370 277 A3 | 5/1990 | H04B/1/66 |
| EP | 0 423 050 A1 | 4/1991 | H04B/1/66 |
| EP | 0 428 156 A2 | 5/1991 | H03M/7/30 |
| EP | 0 446 031 A3 | 9/1991 | H04B/1/66 |
| EP | 0 458 645 A2 | 11/1991 | H04B/1/66 |
| EP | 0 463 473 A2 | 1/1992 | G06F/15/332 |
| EP | 0 466 190 A2 | 1/1992 | G11B/20/10 |
| EP | 0 473 367 A1 | 3/1992 | H03M/7/30 |
| EP | 0 506 394 A2 | 9/1992 | G10L/7/00 |
| EP | 0 525 809 A2 | 2/1993 | H04B/1/66 |
| JP | A 01 069 181 | 3/1989 | H04N/7/137 |
| JP | 6 29934 | 2/1994 | H04B/14/06 |
| JP | 6-149292 | 5/1994 | H03M/7/30 |
| WO | WO 90/09064 | 8/1990 | H04B/1/66 |
| WO | WO 91/16769 | 10/1991 | H04B/1/66 |
| WO | WO 92/17884 | 10/1992 | G11B/20/10 |

OTHER PUBLICATIONS

US 5,285,476, 2/1994, Akagiri et al. (withdrawn)
An application–specific FFT processor Electronic Engineering, Jun. 1988 pps 100 and 104–106.

(List continued on next page.)

*Primary Examiner*—Khai Tran
(74) *Attorney, Agent, or Firm*—Sonnenschein, Nath & Rosenthal LLP

(57) ABSTRACT

A method of encoding information of an input signal using a fixed number of bits for each unit time frame. Part of the encoded information of at least one second frame temporally consecutively or non-consecutively preceding or following a first frame is contained in the encoded information of the first frame. This eliminates fluctuations in the sound quality due to bit surplus/shortage resulting from quantization for achieving efficient encoding and decoding.

35 Claims, 15 Drawing Sheets

U.S. PATENT DOCUMENTS

| | | | | | |
|---|---|---|---|---|---|
| 4,903,301 | A | | 2/1990 | Kondo et al. | 381/30 |
| 4,912,763 | A | | 3/1990 | Galand et al. | 381/31 |
| 4,932,062 | A | | 6/1990 | Hamilton | 381/43 |
| 4,949,383 | A | | 8/1990 | Koh et al. | 381/31 |
| 4,964,166 | A | | 10/1990 | Wilson | 381/34 |
| 5,016,107 | A | | 5/1991 | Sasson et al. | 358/209 |
| 5,040,217 | A | | 8/1991 | Brandenburg et al. | 381/47 |
| 5,047,852 | A | * | 9/1991 | Hanyu et al. | 358/133 |
| 5,109,417 | A | | 4/1992 | Fielder et al. | 381/36 |
| 5,115,240 | A | | 5/1992 | Fujiwara et al. | 341/51 |
| 5,128,963 | A | | 7/1992 | Akagiri | 375/25 |
| 5,142,656 | A | | 8/1992 | Fielder et al. | 381/37 |
| 5,150,387 | A | | 9/1992 | Yoshikawa | 375/122 |
| 5,159,611 | A | | 10/1992 | Tomita et al. | 375/34 |
| 5,185,800 | A | | 2/1993 | Mahieux | 381/29 |
| 5,204,677 | A | | 4/1993 | Akagiri et al. | 341/118 |
| 5,218,561 | A | | 6/1993 | Iwadare | 364/725 |
| 5,222,189 | A | | 6/1993 | Fielder | 395/2 |
| 5,235,671 | A | | 8/1993 | Mazor | 395/2 |
| 5,241,603 | A | | 8/1993 | Akagiri et al. | 381/37 |
| 5,243,588 | A | | 9/1993 | Maeda et al. | 369/54 |
| 5,264,846 | A | | 11/1993 | Oikawa | 341/76 |
| 5,268,685 | A | | 12/1993 | Fujiwara | 341/76 |
| 5,294,925 | A | | 3/1994 | Akagiri | 341/50 |
| 5,301,205 | A | | 4/1994 | Tsutsui et al. | 375/1 |
| 5,311,561 | A | | 5/1994 | Akagiri | 375/122 |
| 5,375,189 | A | | 12/1994 | Tsutsui | 395/2.38 |
| 5,381,143 | A | | 1/1995 | Shimoyoshi et al. | 341/51 |
| 5,388,093 | A | | 2/1995 | Yoshida et al. | 369/124 |
| 5,388,209 | A | | 2/1995 | Akagiri | 395/2.38 |
| 5,404,166 | A | * | 4/1995 | Gillard et al. | 348/390 |
| 5,406,428 | A | | 4/1995 | Suzuki | 360/53 |
| 5,454,011 | A | | 9/1995 | Shimoyoshi | 375/240 |
| 5,461,378 | A | | 10/1995 | Shimoyoshi et al. | 341/51 |
| 5,471,558 | A | | 11/1995 | Tsutsui | 395/2.28 |
| 5,708,473 | A | * | 1/1998 | Mead | 375/240.15 |

OTHER PUBLICATIONS

Application of Quadrature Mirror Filters To Split Band Voice Coding Schemes, Esteban et al., May 9–11, 1977 IEEE International Conference on Acoustics, Speech & Signal Processing, pp. 191–195.

An Application Specific DSP Chip for 100 MHZ Data Rates, Magar et al., IEEE Apr. 11–14, 1988—pps 1989–1992.

Perceptual Transform Coding of Wideband Stereo Signals, James D. Johnston, ICASSP May 23–26, 1989, vol. 3, pp 1993–1996.

Signal Compression: Technology Targets and Research Directions, Nikil Jayant, IEEE Jun. 1992, vol. 10, No. 5, pp 796–818.

J.H. Rothweiler, "Polyphase Quadrature Filters—A New Subband Coding Technique," ICASSP 83 Proceedings, IEEE International Conference on Acoustics, Speech & Signal Processing, Apr. 1983, vol. 3 of 3, pp. 1280–1283.

R.E. Crochiere et al., "Digital Coding of Speech in Sub–bands," American Telephone and Telegraph Company, The Bell System Technical Journal, vol. 55, No. 8, Oct. 1976, pp. 1069–1085.

J.P. Princen et al., "Subband/Transform Coding Using Filter Bank Designs Based on Time Domain Aliasing Cancellation," IEEE, 1987, pp. 2161–2164.

R. Zelinski et al., "Adaptive Transform Coding of Speech Signals" IEEE Transactions on Acoustics, Speech, and Signal Processing, vol. ASSP–25, No. 4, Aug. 1977, pp. 299–309.

M.A. Krasner, "The Critical Band Coder—Digital Encoding of Speech Signals Based on the Perceptual Requirements of the Auditory System," IEEE Journal, vol. 1–3, 1980, pp. 327–331.

"Adaptive Transform Coding With an Adaptive Block Size (ATC–ABS)"—Sugiyama et al. , ICASSP 90 vol. 2, Apr. 3–6, 1990 IEEE—pp 1093–1096.

* cited by examiner

3bits

| | | | |
|---|---|---|---|
| 1 | 0 | 1 | 0 |
| 2 | 0 | 0 | 1 |
| 3 | 0 | 1 | 0 |
| 4 | 0 | 0 | 1 |
| 5 | 0 | 0 | 1 |
| 6 | 1 | 0 | 1 |
| 7 | 1 | 1 | 1 |
| 8 | 1 | 1 | 0 |

| | 3bits | = | | 2bits | + | 1bit (SURPLUS DATA) |
|---|---|---|---|---|---|---|
| 1 | 0 1 0 | | 1 | 0 1 | | 0 |
| 2 | 0 0 1 | | 2 | 0 0 | | 1 |
| 3 | 0 1 0 | | 3 | 0 1 | | 0 |
| 4 | 0 0 1 | | 4 | 0 0 | | 1 |
| 5 | 0 0 1 | | 5 | 0 0 | | 1 |
| 6 | 1 0 1 | | 6 | 1 0 | | 1 |
| 7 | 1 1 1 | | 7 | 1 1 | | 1 |
| 8 | 1 1 0 | | 8 | 1 1 | | 0 |

INFORMATION ENCODING METHOD AND APPARATUS, INFORMATION DECODING METHOD AND APPARATUS AND RECORDING MEDIUM

BACKGROUND OF THE INVENTION

This invention relates to a method and apparatus for encoding input signals by high-efficiency encoding, a recording medium having the high efficiency encoded signals recorded thereon and a method and apparatus for decoding encoded signals transmitted over a transmission channel or reproduced from a recording medium to produce playback signals.

There exist a variety of high efficiency encoding techniques of encoding audio or speech signals. Examples of these techniques include transform coding in which a frame of digital signals representing the audio signal on the time axis is pre-set time units or frames and the frame-based time-axis audio signals are converted by an orthogonal transform into a block of spectral coefficients representing the audio signal on the frequency axis, and a sub-band coding in which the frequency band of the audio signal is divided by a filter bank into a plurality of sub-bands without forming the signal into frames along the time axis prior to coding. There is also known a combination of sub-band coding and transform coding, in which digital signals representing the audio signal are divided into a plurality of frequency ranges by sub-band coding, and transform coding is applied to each of the frequency ranges.

Among the filters for dividing a frequency spectrum into a plurality of equal-width frequency ranges include the quadrature mirror filter (QMF) as discussed in R. E. Crochiere, Digital Coding of Speech in Sub-bands, 55 Bell Syst. Tech J. No.8 (1976). With such QMF filter, the frequency spectrum of the signal is divided into two equal-width bands. With the QMF, aliasing is not produced when the frequency bands resulting from the division are subsequently combined together.

In "Polyphase Quadrature Filters—A New Subband Coding Technique", Joseph H. Rothweiler ICASSP 83, Boston, there is shown a technique of dividing the frequency spectrum of the signal into equal-width frequency bands. With the present polyphase QMF, the frequency spectrum of the signals can be divided at a time into plural equal-width frequency bands.

There is also known a technique of orthogonal transform including dividing the digital input audio signal into frames of a predetermined time duration, and processing the resulting frames using a discrete Fourier transform (DFT), discrete cosine transform (DCT) and modified DCT (MDCT) for converting the signal from the time axis to the frequency axis. Discussions on MDCT may be found in J. P. Princen and A. B. Bradley, Subband Transform Coding Using Filter Bank Based on Time Domain Aliasing Cancellation", ICASSP 1987.

By quantizing the signals divided on the band basis by the filter or orthogonal transform, it becomes possible to control the band subjected to quantization noise and psychoacoustically more efficient coding may be performed by utilizing the so-called masking effects. If the signal components are normalized from band to band with the maximum value of the absolute values of the signal components, it becomes possible to effect more efficient coding.

In a technique of quantizing the spectral coefficients resulting from an orthogonal transform, it is known to use sub bands that take advantage of the psychoacoustic characteristics of the human auditory system. That is, spectral coefficients representing an audio signal on the frequency axis may be divided into a plurality of critical frequency bands. The width of the critical bands increase with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from MDCT, the spectral coefficient data generated by the MDCT within each of the critical bands is quantized using an adaptively allocated number of bits. There are presently known the following two bit allocation techniques.

For example, in IEEE Transactions of Acoustics, Speech and Signal Processing, vol. ASSP-25, No.4, August 1977, bit allocation is carried out on the basis of the amplitude of the signal in each critical band. This technique produces a flat quantization noise spectrum and minimizes the noise energy, but the noise level perceived by the listener is not optimum because the technique does not effectively exploit the psychoacoustic masking effect.

In the bit allocation technique described in M. A. Krassner, The Critical Band Encoder—Digital Encoding of the Perceptual Requirements of the Auditory System, ICASSP 1980, the psychoacoustic masking mechanism is used to determine a fixed bit allocation that produces the necessary signal-to-noise ratio for each critical band. However, if the signal-to-noise ratio of such a system is measured using a strongly tonal signal, for example, a 1 kHz sine wave, non-optimum results are obtained because of the fixed allocation of bits among the critical bands.

For overcoming these inconveniences, a high efficiency encoding apparatus has been proposed in which the total number of bits available for bit allocation is divided between a fixed bit allocation pattern pre-set for each small block and a block-based signal magnitude dependent bit allocation, and the division ratio is set in dependence upon a signal which is relevant to the input signal such that the smoother the signal spectrum, the higher becomes the division ratio for the fixed bit allocation pattern.

With this technique, if the energy is concentrated in a particular spectral component, as in the case of a sine wave input, a larger number of bits are allocated to the block containing the spectral component, for significantly improving the signal-to-noise characteristics in their entirety. Since the human auditory system is highly sensitive to a signal having acute spectral components, such technique may be employed for improving the signal-to-noise ratio for improving not only measured values but also the quality of the sound as perceived by the ear.

In addition to the above techniques, a variety of other techniques have been proposed, and the model simulating the human auditory system has been refined, such that, if the encoding device is improved in its ability, encoding may be made with higher efficiency in light of the human auditory system.

FIG. 1 shows a structural example of an encoding apparatus (encoder) for an acoustic waveform signal.

In this figure, a waveform signal $I_{101}$, entering an input terminal 10, is converted by a transform circuit 11 into a signal frequency component $I_{102}$ and subsequently normalized and quantized by a normalization/quantization circuit 13, with the aid of the quantization step information $I_{103}$ as found by a quantization step decision circuit 12.

The normalization/quantization circuit 13 outputs the normalization coefficient information $I_{104}$ and the encoded signal frequency component $I_{105}$ to a code string generating circuit 14. The code string generating circuit 14 generates, from the quantization step information $I_{103}$, normalization coefficient information $I_{104}$ and the encoded signal frequency $I_{105}$, a code string $I_{106}$, which is outputted at an output terminal 16.

FIG. 2 shows an illustrative arrangement of the converting circuit 11 shown in FIG. 1.

Referring to FIG. 2, an input waveform signal $I_{201}$ corresponding to the input waveform signal $I_{101}$ and supplied via a terminal 20 from the input terminal 10, is split by a first-stage spectrum splitting filter 21 into two frequency band signals $I_{202}$, $I_{203}$. That is, the bandwidth of each of the two frequency band signals $I_{202}$, $I_{203}$ is one-half of the bandwidth of the input waveform signal $I_{201}$, that is, each frequency band signal $I_{202}$, $I_{203}$ is sub-sampled by one-one-half the input waveform signal $I_{201}$. The remaining signal $I_{203}$, divided by the spectrum splitting filter 22, is further split by the frequency splitting filter 22 into two band signals $I_{204}$, $I_{205}$. That is, the bandwidth of each of the two frequency band signals $I_{204}$, $I_{205}$ is one-half of the bandwidth of the input waveform signal $I_{203}$ that is, each frequency band signal $I_{204}$, $I_{205}$ is sub-sampled by one quarter of the input waveform signal $I_{201}$.

These signals $I_{202}$, $I_{204}$ and $I_{205}$ are routed to respective associated forward spectrum transform circuits 23, 24 and 25 where they are processed with forward orthogonal transform, such as MDCT. Spectral signal components $I_{206}$, $I_{207}$ and $I_{208}$, outputted by the spectrum transform circuits 23, 24 and 25, are routed via respective associated terminals 26, 27 and 28 to a downstream circuitry as a signal frequency component $I_{102}$ outputted from the conversion circuit 11.

Of course, a number of conversion circuits other than that shown in FIG. 2 may be employed for splitting the frequency of the input waveform signal to form spectra signals. For example, the input signal may be directly transformed by MDCT into spectral signals, or transformed by DFT or DCT instead of by MDCT. If DFT or DCT is employed, the signal may be split into frequency band components by a frequency spectrum splitting filter, as in the case of FIG. 2.

FIG. 3 shows an illustrative construction of a decoding device configured to reproduce acoustic signals from the code string information generated by the encoding device of FIG. 1 and to output the reproduced signals.

Referring to FIG. 3, a code string $I_{301}$, corresponding to the code string $I_{106}$ shown in FIG. 1, is supplied to an input terminals 30 and thence supplied to a code string resolving circuit 31. The code string separating circuit 31 extracts, from the code string $I_{301}$, the information $I_{302}$ corresponding to the normalization coefficient information $I_{104}$, the information $I_{303}$ corresponding to the signal frequency component $I_{105}$ and the information $I_{304}$ corresponding to the quantization step information $I_{103}$, and routes the extracted signals to a signal component decoding circuit 32.

The signal component decoding circuit 32 restores a signal frequency component $I_{305}$, corresponding to the signal frequency component $I_{102}$, from the information $I_{302}$, $I_{304}$ and $I_{303}$, and routes the restored information to inverse-conversion circuit 33. The inverse, conversion circuit 33 effects, inverse-conversion corresponding to the conversion by the conversion circuit 11 for generating an acoustic waveform signal $I_{306}$ which is outputted at an output terminal 34.

The inverse-conversion circuit 33 has a configuration as shown for example in FIG. 4 which is a counterpart of the configuration shown in FIG. 2.

In FIG. 4, signal components $I_{401}$, $I_{402}$ and $I_{403}$, respectively corresponding to the signal components $I_{206}$, $I_{207}$ and $I_{208}$, are supplied to terminals 40, 41 and 42, so as to be routed to respective associated inverse spectrum transform circuits 43, 44 and 45. These inverse spectrum transform circuits 43, 44 and 45 effect inverse orthogonal transform operations associated with the orthogonal transform operations performed by the forward spectrum transform circuits 23, 24 and 25, and output respective band signals $I_{404}$, $I_{405}$ and $I_{406}$ associated with the signal components $I_{202}$, $I_{203}$ and $I_{204}$, respectively.

Of the inverse orthogonal transformed signals, the signals $I_{406}$, $I_{405}$ are routed to a band synthesizing filter 46 so as to undergo signal synthesis which is a counterpart of the operation performed by the spectrum splitting filter 22. From the band synthesizing filter 47 is outputted via a terminal 48 a signal $I_{408}$, which represents the acoustic waveform signal $I_{306}$, and is outputted to the output terminal 304.

Referring to FIG. 5, the encoding method customarily employed in the encoder shown in FIG. 1 is explained.

In FIG. 5, the spectral signal components ES have been produced by converting the input acoustic waveform signals by the converting circuit 11 shown in FIGS. 1 and 2 at an interval of a pre-set time frame into 64 spectral signal components ES. These 64 spectral signal components ES are grouped into a preset number of, herein five, bands $b_1$ to $b_5$ so as to be normalized and quantized by the normalization/quantization circuit 13. These groups are herein referred to as an encoding unit. The bandwidths of the encoding units are selected to be narrower and broader towards the low and high frequency sides, respectively, so that generation of the quantization noise may be controlled so as to be suited to the characteristics of the human hearing mechanism. FIG. 5 shows the level of the absolute value of the spectral signal (frequency component) resulting from MDCT, represented in dB, and the values of the normalization coefficients of the respective encoding units.

FIG. 6 shows the manner in which the second encoding unit, for example, shown in FIG. 5, is normalized and quantized.

If, in FIG. 6, the seventh spectral signal component ES, as the maximum value in the encoding unit, is found as the normalization coefficient value, and quantized with e.g., 3 bits, there are obtained codes associated with the respective spectral signal components, as shown in FIG. 7. That is, there are obtained codes "010", "001", "010", "001", "001", "101", "111" and "110" corresponding to the first, second, third, fourth, fifth, sixth and seventh spectral signal components, as codes resulting from quantization with three bits, respectively. Since the actual quantized spectral signals have positive or negative signs, one more bit, that is a sign bit, is required in addition to the three bits shown in FIG. 7. However, this sign bit is not shown herein for clarity.

FIG. 8 shows an example of the code string $I_{106}$ generated by the encoder shown in FIG. 1.

In this figure, the code string $I_{106}$ is made up of information data for the five encoding units $U_1$ to $U_5$, each of which is made up of the quantization step information, normalization coefficient information and normalized and quantized signal component information data. This code string $I_{106}$ is configured to be recorded on a recording medium, such as a magneto-optical disc. If an encoding unit information data has no quantization step information data, as in the case of the encoding unit information data $U_4$, it indicates that encoding is not carried out in the encoding unit.

In the conventional method, the number of bits used for quantization is fixed from frame to frame.

Thus, if the spectral energy is concentrated in a high range side encoding unit of a broad bandwidth with a consequently increased number of spectral components, or if a large number of lone spectral components exist from a low range side to a high range side, a larger number of bits for quantization is required for quantization on the whole in order to secure sufficient sound quality. Thus the number of usable bits which is fixed from frame to frame is insufficient, that is the number of bits falls in shortage. Conversely, if the level of the input signal sound level is low, the number of bits used for quantization in a frame is decreased, as a result of which bits for quantization become redundant.

Consequently, the sound quality becomes insufficient if the number of bits falls in shortage if the bits for quantization falls into shortage, while the sound quality more than is necessary is produced if the bits become redundant, so that efficient encoding cannot be achieved.

OBJECT AND SUMMARY OF THE INVENTION

It is therefore a principal object of the present invention to provide a method and apparatus for encoding, a method and apparatus for decoding and a recording medium in which changes in the sound quality due to bit surplus or shortage for quantization is eliminated to enable efficient encoding and decoding.

In one aspect, the present invention provides a method for encoding the information of an input signal using a fixed number of bits for each unit time frame, wherein part of the encoded information of at least one second frame temporally consecutively or non-consecutively preceding or following a first frame is contained in the encoded information of the first frame.

The part of the encoding information includes the information indicating the second frame. The part of the encoding information for at least one second frame temporally consecutively or non-consecutively preceding or following a first frame is surplus data which would surpass a pre-set fixed number of bits for the second frame if the input signal for the second frame were encoded using the number of bits which would be required for realizing the required quality of decoded signals obtained on decoding the encoded information for the second frame. In addition, the part of the encoded information is such data in the absence of which the encoded information of the second frame can at least be decoded. Also the part of the encoded information is subdivided and contained in a plurality of first frames.

With the information encoding method of the present invention, the encoded information of plural frames encoded using a number of bits necessary for producing the decoded signals of a required quality is preserved. If, when the input signal of each frame is encoded using the necessary number of bits, there is produced surplus data exceeding the fixed number of bits for each frame, such first frame among plural frames holding the encoded information in which the surplus data can be stored as the aforementioned part of the encoded information is searched. The surplus data is formed in a code string by being contained in the encoded information of the first frame in which the surplus data can be stored. In addition, with the information encoding method of the present invention, the input signal of a frame is encoded using a number of bits required for realizing the quality required of a decoded signal. If, when the input signal of the frame is encoded using the required number of bits, surplus data is produced which surpasses the fixed number of bits of the frame, such surplus data is preserved. If the required number of bits is less than the fixed number of bits of the frame, it is judged whether or not such preserved surplus data in the past can be stored in the frame, and if the preserved surplus data in the past can be stored, it is included in the encoding information of the frame and formed into a code string as the aforementioned part of the encoding information.

With the information decoding method of the present invention, a code string produced using a fixed number of bits for each unit time frame is decoded, wherein a code string in which part of the encoded information of at least one second frame temporally consecutively or non-consecutively preceding or following a first frame is contained in the encoded information of the first frame is decoded.

If such part of the encoding information represents surplus data exceeding the fixed number of bits of the second frame when the signal of the second frame is encoded using a number of bits required for obtaining the quality required of a signal decoded from the encoded information of the second frame, and if a code string in which surplus data of an arbitrary second frame is contained in the encoded information of a first frame temporally posterior to the second frame is to be decoded, the surplus data contained in such first frame is separated and preserved. If the surplus data of the second frame is in the surplus data held so far, both surplus data are decoded. The part of the encoded information is preserved and, if, when such part of the encoded information is preserved, the recording capacity for preserving such part of the encoded information is exceeded, part of the encoded information of a frame older in the preserving sequence or further from the current frame is sequentially erased and part of the encoded information of the current frame is preserved. If such part of the encoding information represents surplus data exceeding the fixed number of bits of the second frame when the signal of the second frame is encoded using a number of bits required for obtaining the quality required of a signal decoded from the encoded information of the second frame, and if a code string in which surplus data of an arbitrary second frame is contained in the encoded information of a first frame temporally previous to such second frame is to be decoded, a code string of a pre-set number of frames is taken out. If the surplus data of the second frame is contained in the code string of the pre-set number of frames, such surplus data is also decoded.

In another aspect, the present invention provides an apparatus for encoding an input signal using a fixed number of bits for each unit time frame including means for separating part of the encoded information of at least one second frame temporally consecutively or non-consecutively preceding or following a first frame, and synthesizing means for incorporating such part of the encoded information separated by the separating means into the encoded information of the first frame.

The separating means incorporates the information indicating the second frame in the aforementioned part of the encoding information. Part of the encoding information for at least one second frame temporally consecutively or non-consecutively preceding or following a first frame is surplus data which would surpass a pre-set fixed number of bits for the second frame if the input signal for the second frame were encoded using the number of bits which would be required for realizing the required quality of decoded signals obtained on decoding the encoded information for the second frame. In addition, such part of the encoded information is such data in the absence of which at least the encoded information of the second frame can be decoded.

The separating means subdivides the part of the encoding information while the synthesizing means incorporates the subdivided portions of such part of the encoding information in a plurality of first frames. The synthesizing means includes means for preserving the encoded information of plural frames encoded using a number of bits necessary for producing the decoded signals of a required quality, and means for discriminating such first frame among plural frames preserving the encoded information in which surplus data exceeding the fixed number of bits for each frame can be stored as the aforementioned part of the encoded information if, when the input signal of each frame is encoded using the necessary number of bits, there is produced such surplus data. The synthesizing means also includes means for generating a code string consisting in the encoding information of a first frame capable of storing the surplus data and the surplus data contained in the first frame. The information encoding apparatus also includes encoding means for encoding the input signal of a frame using a number of bits required for realizing the quality required of a decoded signal. The synthesizing means has preserving means for preserving surplus data which surpasses the fixed number of bits of the frame if, when the input signal of the frame is encoded using the required number of bits, the surplus data is produced, and means for judging whether or not preserved surplus data in the past can be stored in a frame if the required number of bits is less than the fixed number of bits of the frame. The synthesizing means also has means for incorporating said surplus data as the aforementioned part of the encoding information in a frame found to be capable of storing the surplus data for forming a code string.

The information decoding apparatus of the present invention is such apparatus in which a code string produced using a fixed number of bits for each unit time frame is decoded. A code string in which part of the encoded information of at least one second frame temporally consecutively or non-consecutively preceding or following a first frame is contained in the encoded information of the first frame is decoded.

The information decoding apparatus includes separating means for separating surplus data contained in the first frame if the aforementioned part of the encoding information represents surplus data exceeding the fixed number of bits of the second frame when the signal of the second frame is encoded using a number of bits required for obtaining the quality required of a signal decoded from the encoded information of the second frame, and if a code string in which surplus data of an arbitrary second frame is contained in the encoded information of a first frame temporally posterior to said second frame is to be decoded. The apparatus also includes means for preserving the separated surplus data, synthesizing means for synthesizing surplus data of the second frame, if any, present in the surplus data preserved thus far, and decoding means for decoding the synthesized encoded information. The information decoding apparatus also includes holding controlling means whereby, if the recording capacity for holding the part of the encoded information is exceeded when preserving the part of the encoded information, part of the encoded information of a frame older in the holding sequence or further from the current frame is sequentially erased and part of the encoded information of the current frame is preserved. The information decoding apparatus also includes means for taking out a code string of a pre-set number of frames if the part of the encoding information represents surplus data exceeding the fixed number of bits of the second frame when the signal of the second frame is encoded using a number of bits required for obtaining the quality required of a signal decoded from the encoded information of the second frame, and if a code string in which surplus data of an arbitrary second frame is contained in the encoded information of a first frame temporally previous to said second frame is to be decoded. The information decoding apparatus also includes synthesizing means for synthesizing surplus data of the second frame, if any, present in the code string of the pre-set number of frames, and decoding means for decoding the synthesized encoded infirmation.

In still another aspect, the present invention also provides a recording medium for encoding the information encoded from an input signal using a fixed number of bits for each unit time frame, wherein a code string in which part of the encoded information of at least one second frame temporally consecutively or non-consecutively preceding or following a first frame is contained in the encoded information of the first frame is recorded thereon.

The part of the encoding information for at least one second frame temporally consecutively or non-consecutively preceding or following a first frame is surplus data which would surpass a pre-set fixed number of bits for the second frame if the input signal for the second frame were encoded using the number of bits which would be required for realizing the required quality of decoded signals obtained on decoding the encoded information for the second frame, wherein the surplus data of an arbitrary second frame is contained in the encoded information of a first frame temporally posterior or previous to the first frame.

That is, according to the present invention, data of a frame having an insufficient number of bits for quantization is written in a frame having redundant bits for quantization and the subsidiary information for identifying a frame to which belongs the data is annexed to the data for enabling decoding.

It depends on the delay time allowed by the encoding system or the pre-reading capability of the decoding system in which of the frames having redundant bits and lying ahead or at back of the currently processed frame is to be written the data of a frame suffering from shortage in quantization bits. This information can be written in the code string or specified by the system. If the data of the frame suffering from bit shortage can be subdivided, it can be efficiently contained in frames having redundant quantization bits.

If the data written in a frame suffering from bit shortage is such data that can be decoded by itself, it is unnecessary to preserve data to be written in the frame with redundant bits until processing of the storable frame or pre-read frame data in a prescribed amount in case of a limited system memory storage capacity. Thus the sound quality comparable to that of the conventional system may be achieved without obstructing the decoding process.

Thus the higher encoding efficiency may be achieved with the present invention than in the conventional method.

With the information encoding method and apparatus of the present invention, part of the encoded information of at least one second frame temporally consecutively or non-consecutively preceding or following a first frame is contained in the encoded information of the first frame for adjusting the surplus/deficit of the number of the quantization bits.

With the information decoding method and apparatus of the present invention, a code string in which part of the encoded information of at least one second frame temporally consecutively or non-consecutively preceding or following a first frame is contained in the encoded information of the first frame is decoded for adjusting the surplus/deficit of the number of the quantization bits.

With the recording medium according to the present invention, a code string in which part of the encoded information of at least one second frame temporally consecutively or non-consecutively preceding or following a first frame is contained in the encoded information of the first frame is recorded for adjusting the surplus/shortage in the number of quantization bits.

Thus it is seen that, with the information encoding method and apparatus, information decoding method and apparatus and the recording medium according to the present invention, part of the encoded information of at least one second frame temporally consecutively or non-consecutively preceding or following a first frame is contained in the encoded information of the first frame for adjusting the surplus/shortage of the number of quantization bits, so that data of a frame with redundant bits can be transmitted beyond such frame resulting in efficient encoding and decoding.

If the present invention is applied to encoding of acoustic signals, data of a frame suffering from noise due to shortage in encoding bits may be written in a frame having redundant bits for reducing the noise in the decoded acoustic signals as heard by ears, thus enabling efficient encoding and decoding of information signals.

DESCRIPTION OF PREFERRED EMBODIMENTS

Figure 1:
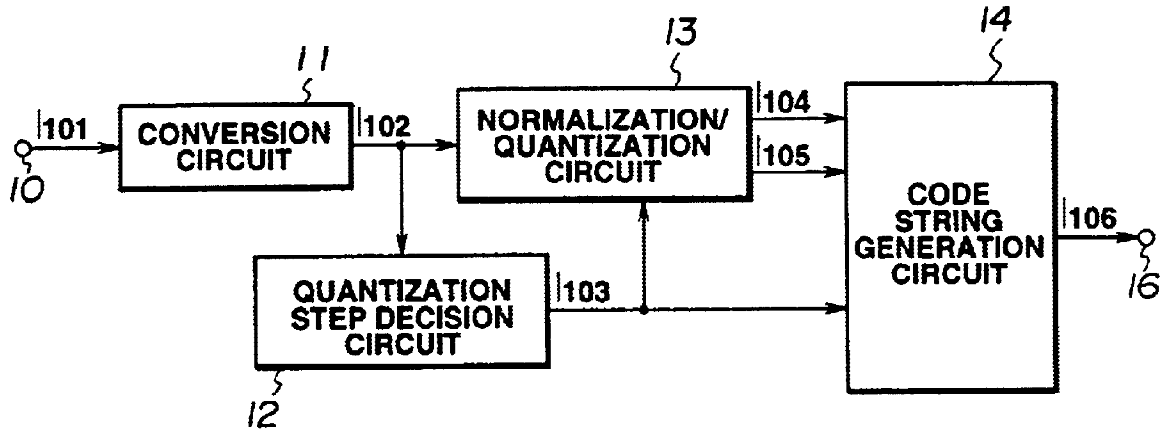
FIG.1 PRIOR ART
FIG. 1 is a schematic block circuit diagram showing a conventional encoder.

Referring to the drawings, preferred embodiments of the present invention will be explained in detail. In the following description, the parts or components similar to those of the conventional apparatus described above are omitted for clarity.

Figure 9:
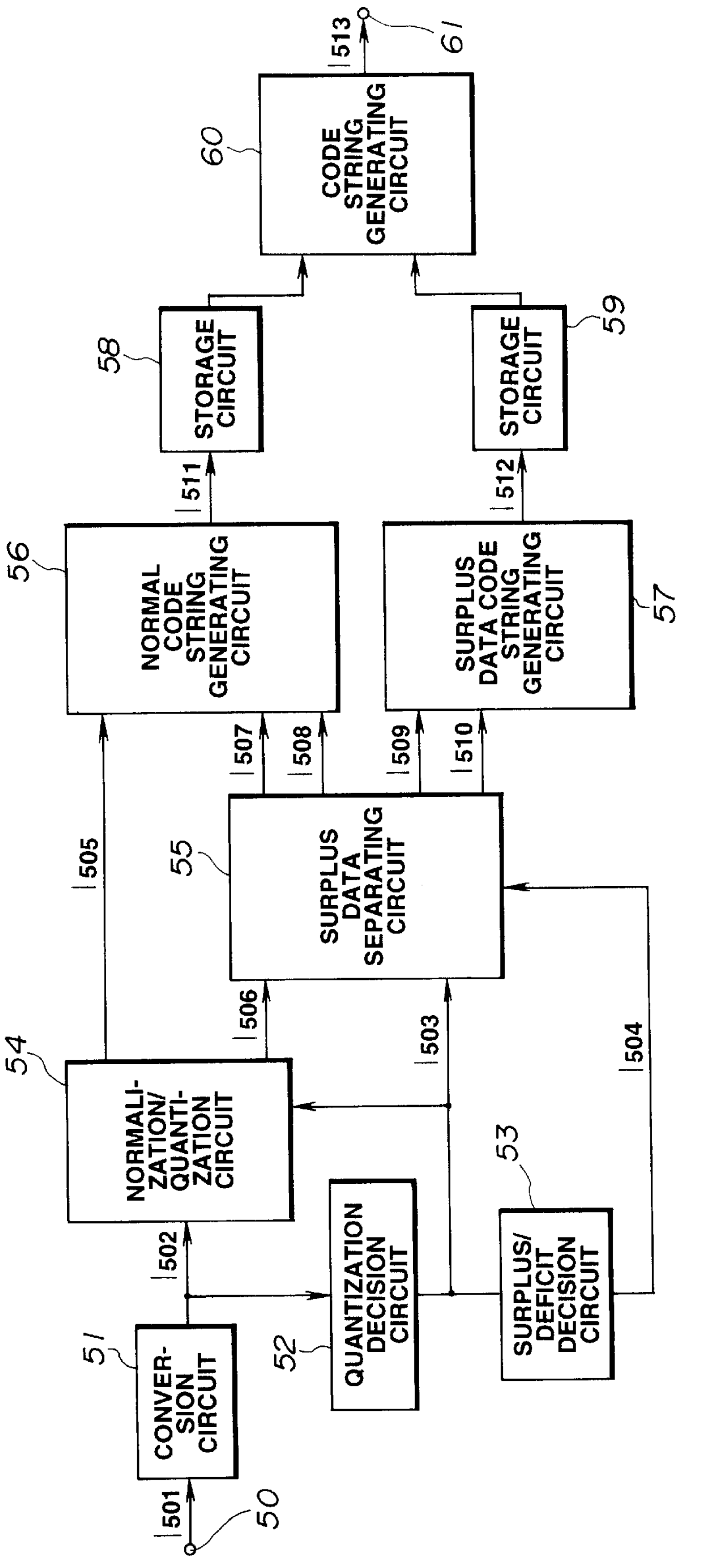
FIG. 9 is a schematic circuit diagram showing an information encoding apparatus according to an embodiment of an information encoding method of the present invention.

FIG. 9 shows a configuration of an encoder (encoding apparatus) for carrying out the encoding method for acoustic waveform signals according to the present invention.

The encoder according to an embodiment of the present invention has a quantization step decision circuit 52, a surplus/shortage decision circuit 53 and a surplus data separating circuit 55, for separating part of the encoding information for at least one second frame temporally consecutively or non-consecutively preceding or succeeding a first frame if such part is surplus data which would surpass a pre-set fixed number of bits for the second frame if the input signal for the second frame were encoded using the number of bits which would be required for realizing the required quality of decoded signals obtained on decoding the encoded information for the second frame. The encoder also has a normal code string generating circuit 56, a surplus data code string generating circuit 57, memory circuits 58, 59 and a code string generating circuit 60 for generating a code string so that the separated surplus data is included in the encoding information for the first frame.

Figure 2:
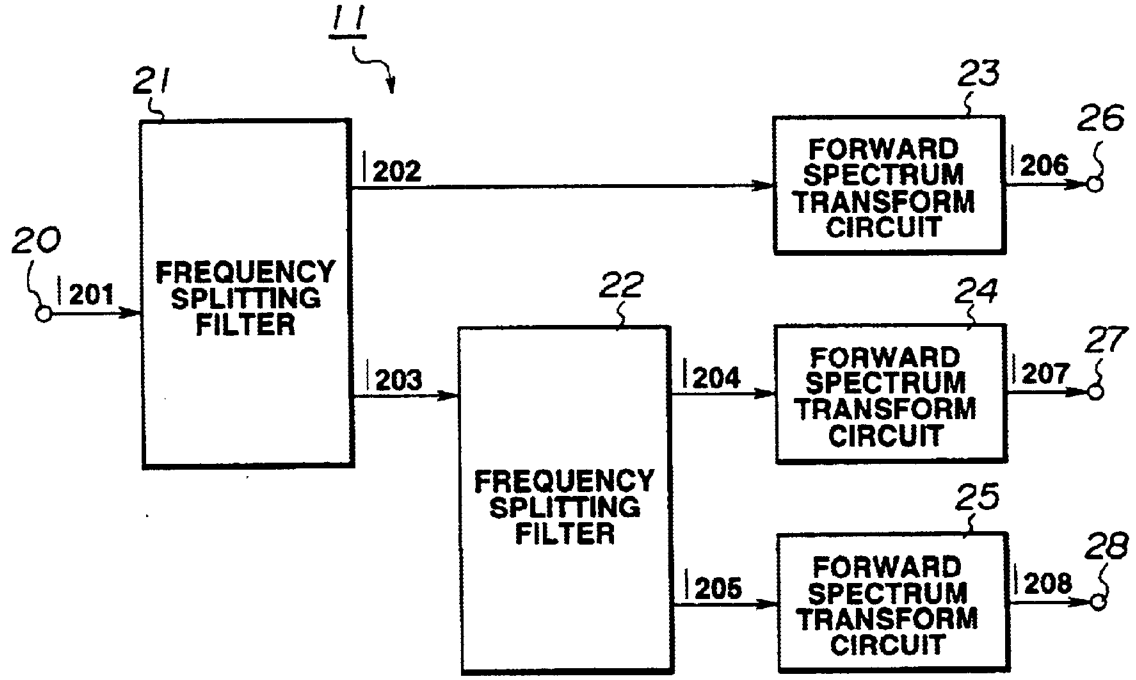
FIG.2 PRIOR ART
FIG. 2 is a block circuit diagram showing an illustrative arrangement of a converting circuit.
Figure 3:
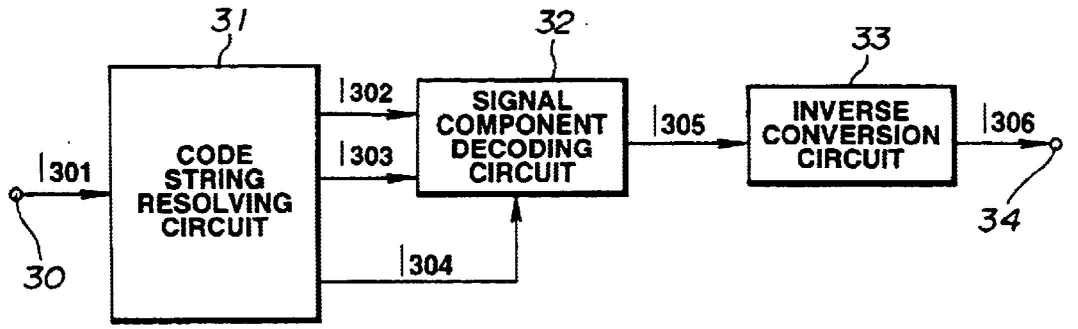
FIG.3 PRIOR ART
FIG. 3 is a schematic block circuit diagram showing a conventional decoder.

Referring to FIG. 9, an acoustic waveform signal $I_{501}$, entering an input terminal 50, is converted by a converting circuit 51, configured similarly to the converting circuit shown in FIG. 2, into signal frequency components $I_{502}$ from one unit time frame to another. The signal frequency components $I_{502}$ are transmitted to the quantization step decision circuit 52 and to a normalization/quantization circuit 54.

The quantization step decision circuit 52 finds, from the frequency components $I_{502}$, the information on the number of bits $I_{503}$ required for realizing the necessary sound quality from one encoding unit to another. The encoding unit is obtained by dividing the signal frequency components $I_{502}$ from one frequency band to another. In the conventional practice, the number of quantization bits for the respective encoding units is adjusted so that the total number of bits will be comprised within a preset number. In the present embodiment, the information on the required number of bits $I_{503}$, found from one encoding unit to another, without making such adjustments. The information on the required number of bits $I_{503}$ is transmitted to the normalization/quantization circuit 54, surplus data separating circuit 55 and to the surplus/shortage decision circuit 53, as later explained.

The surplus/shortage decision circuit 53 sums the information concerning the number of bits for each encoding unit $I_{503}$, from frame to frame, and decides whether or not the total number of bits exceeds a pre-set fixed number of bits. An output decision result information $I_{504}$ of the surplus/shortage decision circuit 53 is routed to the surplus data separating circuit 55.

The normalization/quantization circuit 54 normalizes and quantizes the signal frequency components $I_{502}$ based upon the information concerning the number of bits $I_{503}$ for each encoding unit, as found by the quantization step decision circuit 52, and outputs the resulting normalization coefficient information $I_{505}$ and the normalized and quantized signal frequency components $I_{506}$. The normalization coefficient information $I_{505}$ and the signal frequency component $I_{506}$ are routed to the normal code string generating circuit 56 and to the surplus data separating circuit 55, respectively.

Based upon the decision result information $I_{504}$ from the surplus/shortage decision circuit 53, the surplus data separating circuit 55 separates the normalized and quantized data from the normalization/quantization circuit 54, into the signal frequency components $I_{507}$, normalized and quantized with the number of usable bits for quantization of a frame under consideration and the information on the number of bits $I_{508}$, on one hand, and into the signal frequency components $I_{509}$, normalized and quantized with the number of bits exceeding the number of usable bits for quantization of the frame under consideration, and the information on the number of surplus bits $I_{508}$, on the other hand.

Figures 10, 11:
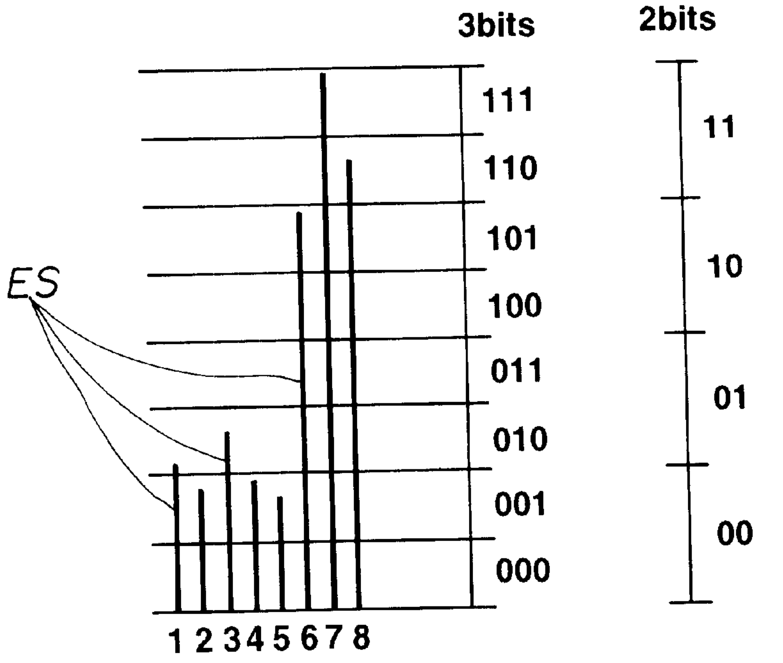
FIG. 10 illustrates the spectral signal components of an encoding unit and the number of quantization bits for encoding according to the present invention.
FIG. 11 illustrates separation of surplus bits.

Referring to FIGS. 10 and 11, an example of dividing the signal frequency component $I_{506}$, entering the surplus data separating circuit 55, into the signal frequency component $I_{507}$ and the signal frequency component $I_{509}$, will be explained.

Figures 6, 7:
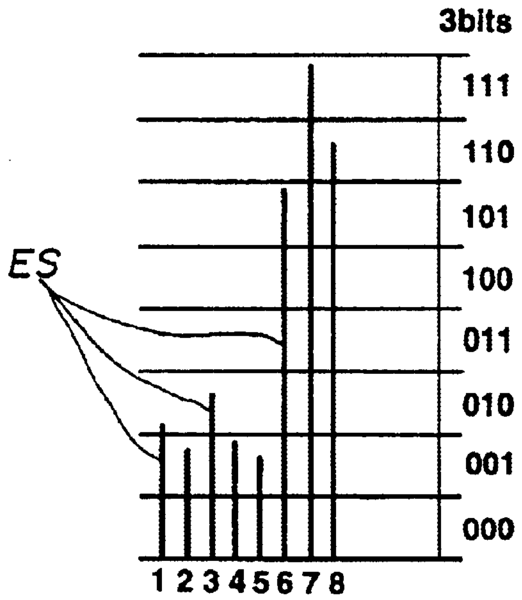
FIG.6 PRIOR ART
FIG.7 PRIOR ART
FIG. 6 illustrates the second one of the encoding units of FIG. 5 along with the number of quantization bits.
FIG. 7 illustrates codes resulting from normalization and quantization of the respective spectral signal components shown in FIG. 6.
Figure 8:
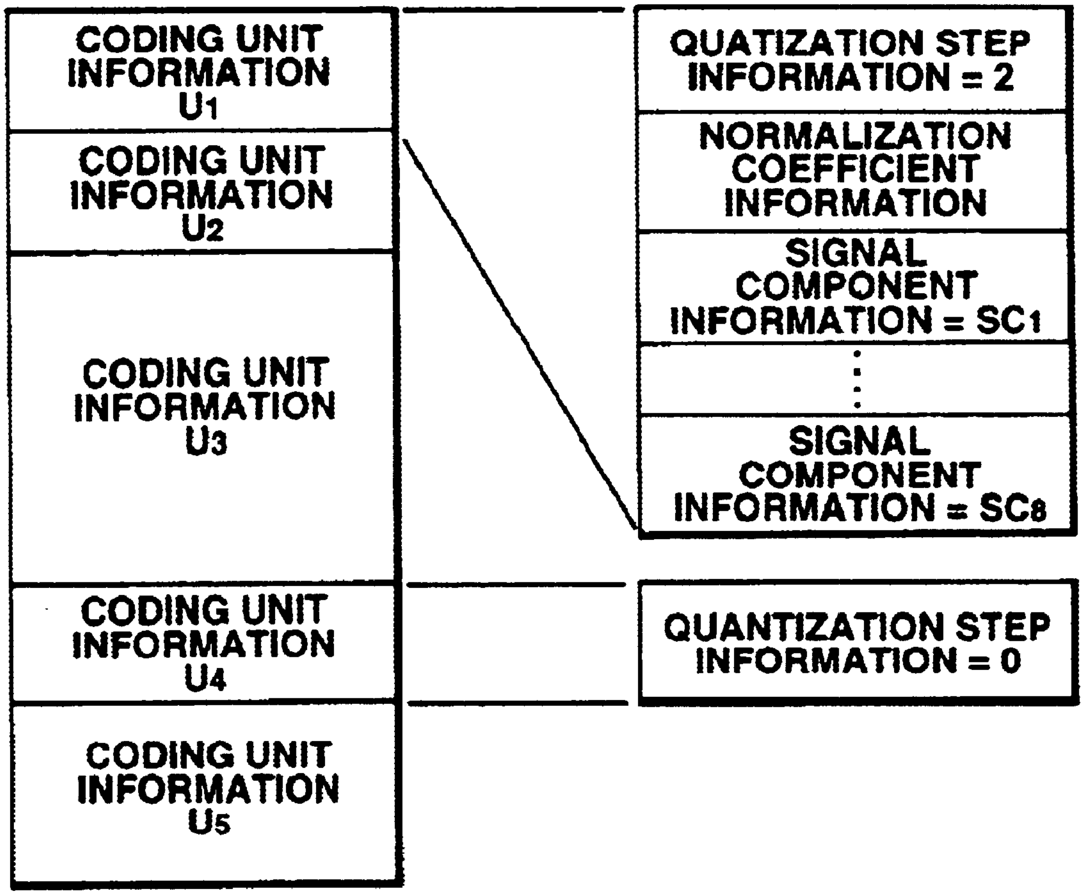
FIG.8 PRIOR ART
FIG. 8 illustrates a code string encoded by a conventional encoder.

FIGS. 10 and 11 show an example of separating the signal frequency components of an encoding unit, quantized by three bits in a similar manner to FIGS. 6 and 7, into 2 bit portions and 1 bit portions. Specifically, each code is divided into 2 MSB side bits and 1 lower most bit (LSB), which lower most bit is separated as surplus data. That is, if the seventh spectral signal component ES, as a maximum value of the encoding unit, is found as a normalization coefficient value, and the surplus is separated from the input normalized and quantized spectral signal component $I_{506}$, the first spectral signal component ES is separated into "01" and "0", the second spectral signal component ES is separated into "00" and "1", the third spectral signal component ES is separated into "01" and "0", the fourth spectral signal component ES is separated into "00" and "1", the fifth spectral signal component ES is separated into "00" and "1", the sixth spectral signal component ES is separated into "10" and "1", the seventh spectral signal component ES is separated into "11" and "1" and the eighth spectral signal component ES is separated into "11" and "0", as shown in FIG. 10.

It is seen from the example shown in FIGS. 10 and 11 that the MSB side 2-bit portions by themselves can be subsequently decoded even in the absence of surplus one bit, that is the LSB.

The surplus data may be separated in a manner different from that described above. On the other hand, if the surplus data can be positively held at the time of decoding, it is unnecessary that data remaining after separation of the surplus data be decodable by itself.

The normal code string generating circuit 56 combines the normalization coefficient information $I_{505}$, the signal frequency component $I_{507}$ normalized and quantized with the number of bits from the surplus data separating circuit 55, usable for quantization for the frame under consideration, and the corresponding information on the number of bits $I_{508}$, into a code string $I_{511}$, which is outputted. This code string, referred to herein as a normal code string, is fed to a memory circuit 58 operating as holding means.

On the other hand, the surplus data code string generating circuit 57 is fed from the surplus data separating circuit 55 with the signal frequency component $I_{509}$, normalized and quantized with the number of bits which has surpassed the number of bits usable for quantization in the frame under consideration and the information on the number of surplus bits $I_{510}$, and combines the number of the frame under consideration, the signal frequency component $I_{509}$, normalized and quantized with the number of bits which has surpassed the number of bits usable for quantization and the number of surplus bits $I_{510}$ into one code string $I_{512}$ which is outputted. This code string, referred to herein as a surplus data code string, is sent to the memory circuit 59 operating as holding means.

The memory circuits 58, 59 are used for temporarily storing the input normal code string $I_{511}$ and the input surplus data code string $I_{512}$, respectively. The storage operation by the memory circuits 58 and 59 will be explained subsequently.

The normal code string $I_{511}$ and the input surplus data code string $I_{512}$, read out from the storage circuits 58 and 59, respectively, are sent to a code string generating circuit 60 which combines the normal code string $I_{511}$ and the input surplus data code string $I_{512}$ into one code string $I_{513}$ which is outputted.

Figure 12:
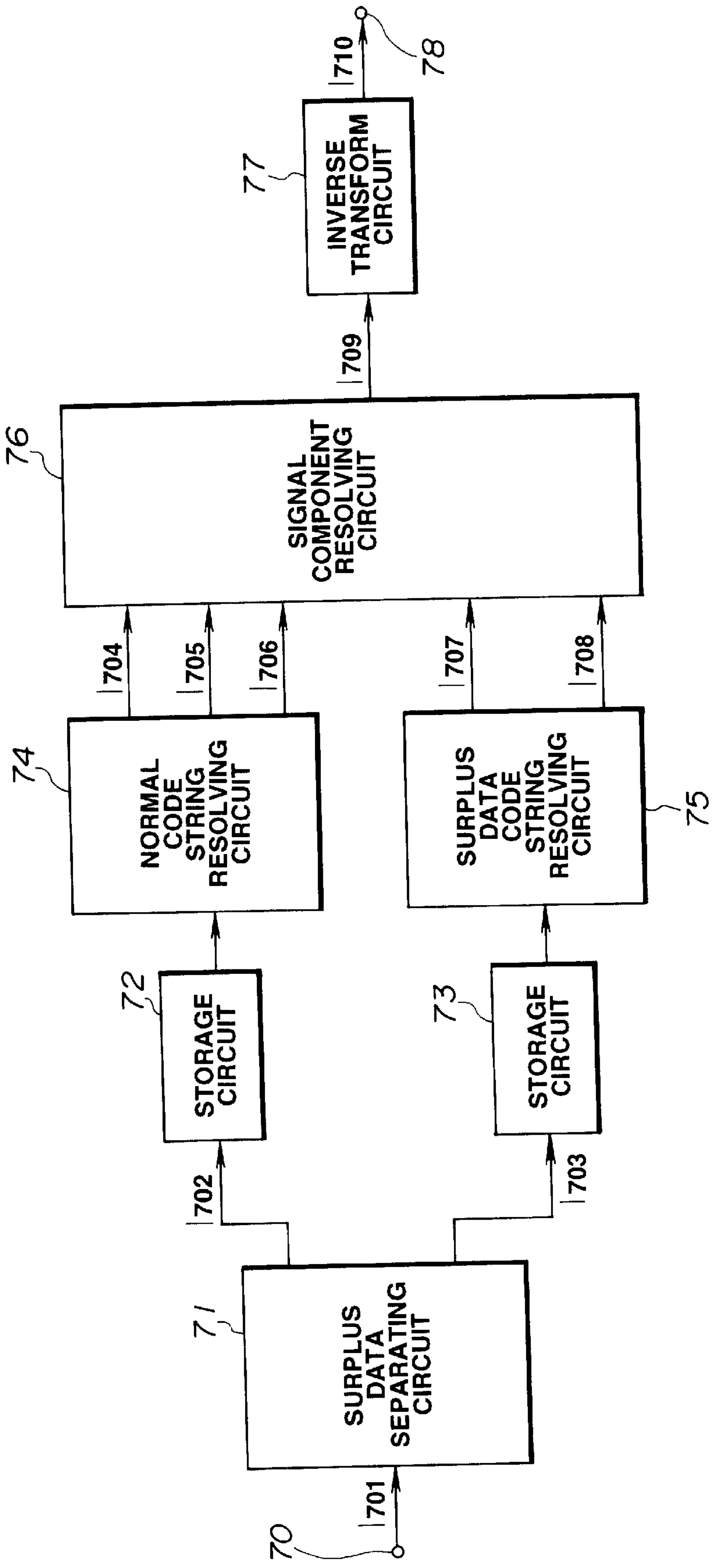
FIG. 12 is a schematic block circuit diagram showing an information decoding apparatus for carrying out the information decoding method of the present invention.

FIG. 12 shows a configuration of a decoding apparatus (decoder) which is a counterpart device of the encoder shown in FIG. 9, in other words, an apparatus for carrying out the decoding method according to the present invention.

Referring to FIG. 12, the decoder of the present embodiment includes a surplus data separating circuit 71, operating as separating means for separating the surplus data code string and the normal code string from each other, and memory circuits 72, 73, operating as holding means for holding the surplus data code string and the normal code string, respectively. The decoder also includes, as synthesizing means for synthesizing the surplus data code string thus far held and the normal code string associated with the surplus data code string and decoding means for decoding the synthesized encoded information, a normal code string resolving circuit 74, a surplus data code string resolving circuit 75, a signal component decoding circuit 76 and a back-conversion circuit 77.

Referring to FIG. 12, a code string $I_{701}$, corresponding to the code string $I_{513}$, is supplied to the input terminal 70 and thence to the surplus data separating circuit 71. If the code string $I_{701}$ contains the normal code string $I_{702}$ corresponding to the normal code string $I_{511}$ and the surplus code string $I_{703}$ corresponding to the surplus code string $I_{512}$, the surplus data separating circuit 71 separates the normal code string $I_{702}$ and the surplus code string $I_{703}$ in the code string $I_{701}$ from each other. The normal code string $I_{702}$ and the surplus code string $I_{703}$ are sent to the memory circuits 702, 703, respectively.

The memory circuits 702, 703 temporarily store the input code strings $I_{702}$, $I_{703}$ temporarily. The storage operations for the normal code string $I_{702}$ and the surplus data code string $I_{703}$ by the memory circuits 72, 73 will be explained subsequently.

The normal code string $I_{702}$, read out from the storage circuit 72, is sent to the normal code string resolving circuit 74, while the surplus data code string $I_{703}$ from the memory circuit 73 is sent to the surplus data code string separating circuit 75.

The normal code string separating circuit 74 separates the input normal code string $I_{702}$ into the normalization coefficient information $I_{704}$, corresponding to the normalization coefficient information $I_{505}$, the normalized and quantized signal frequency components $I_{705}$ corresponding to the signal frequency component $I_{507}$ and the bit number information $I_{706}$ corresponding to the bit number information $I_{508}$.

If there is the surplus data code string $I_{703}$ for the frame under consideration, the surplus data code string resolving circuit 75 separates the surplus data code string $I_{703}$ into the normalized and quantized surplus signal frequency components $I_{707}$ corresponding to the signal frequency component $I_{509}$ and the surplus bit number information $I_{708}$ corresponding to the surplus bit number information $I_{510}$.

Output data of the normal code string separating circuit 74 and the surplus data code string separating circuit 75 are sent to the signal component decoding circuit 76. The signal component decoding circuit 76 restores the signal frequency component $I_{709}$ corresponding to the signal frequency component $I_{502}$ from the input data and outputs the restored data.

If there is the surplus data for the frame under consideration, such surplus data is decoded simultaneously. If, as discussed in connection with the encoder, the surplus data is the LSB of the signal frequency component of an encoding unit, it is connected as LSB to the signal frequency component of the encoding unit under consideration by way of decoding. That is, if the LSB of the three bits is the surplus data as in the example shown in FIGS. 10 and 11, the surplus one bit is coupled to the LSB side of the two-bit signal frequency component to form a 3-bit signal frequency component by way of decoding.

Figure 4:
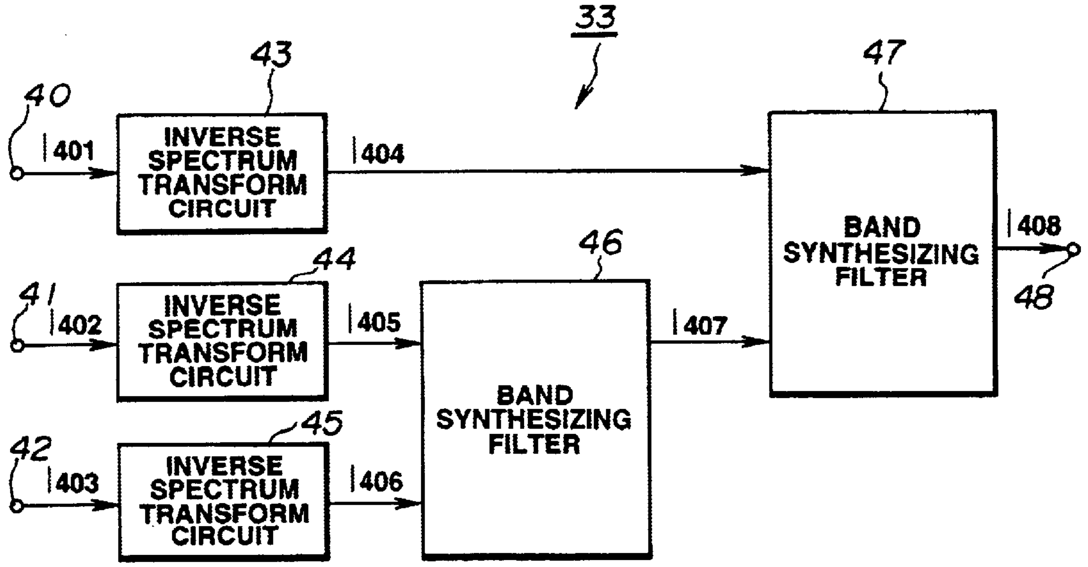
FIG.4 PRIOR ART
FIG. 4 is a block circuit diagram showing an illustrative arrangement of a back-converting circuit.
Figure 5:
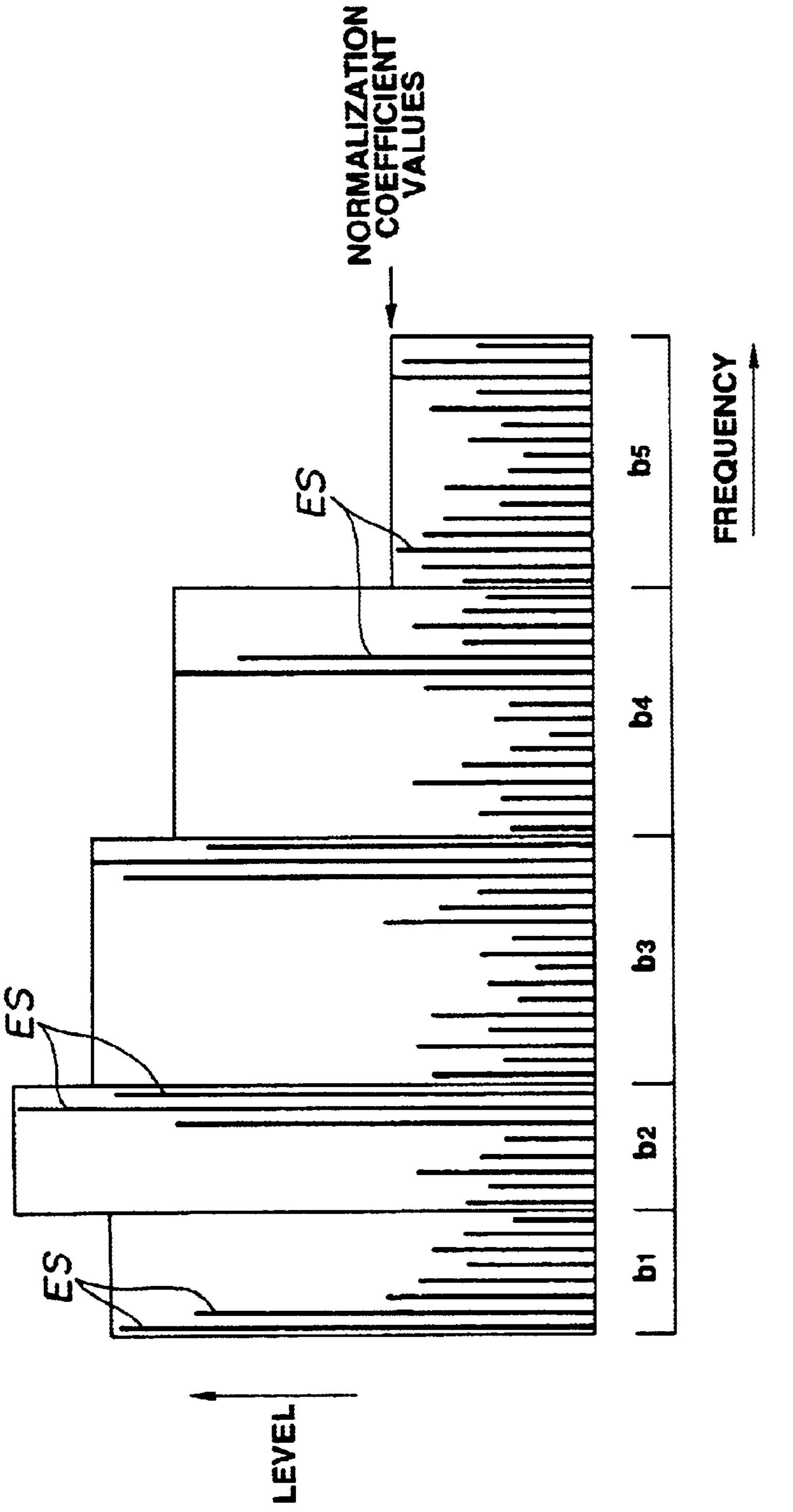
FIG.5 PRIOR ART
FIG. 5 illustrates an example of encoding units in a time frame.

The signal frequency component $I_{709}$ from the signal component decoding circuit 76 is converted by the inverse transform circuit 77, configured similarly to the circuit shown in FIG. 4, into an acoustic waveform signal $I_{710}$, so as to be outputted via an output terminal 78.

The storage operation by the memory circuits 58, 59 of the encoder and the memory circuits 72, 73 of the decoder will be explained.

In the present embodiment, the surplus data is configured to be stored in other frames. As methods for storing the surplus data in other frames, it may be contemplated to allow for delay of the output code string $I_{513}$ at the time of encoding and to effect pre-reading of the input code string $I_{701}$ at the time of decoding. That is, the memory circuits 58, 59 of the encoder are provided for storing the surplus data in other frames by allowing for delay during encoding, while the memory circuits 72, 73 of the decoder are provided for storing the surplus data in other frames by pre-reading during encoding.

The processing flow for encoding and decoding for each case is shown in FIGS. 13 to 16, while an example for explaining the respective processing operations is shown in FIGS. 17 to 20.

Figure 13:
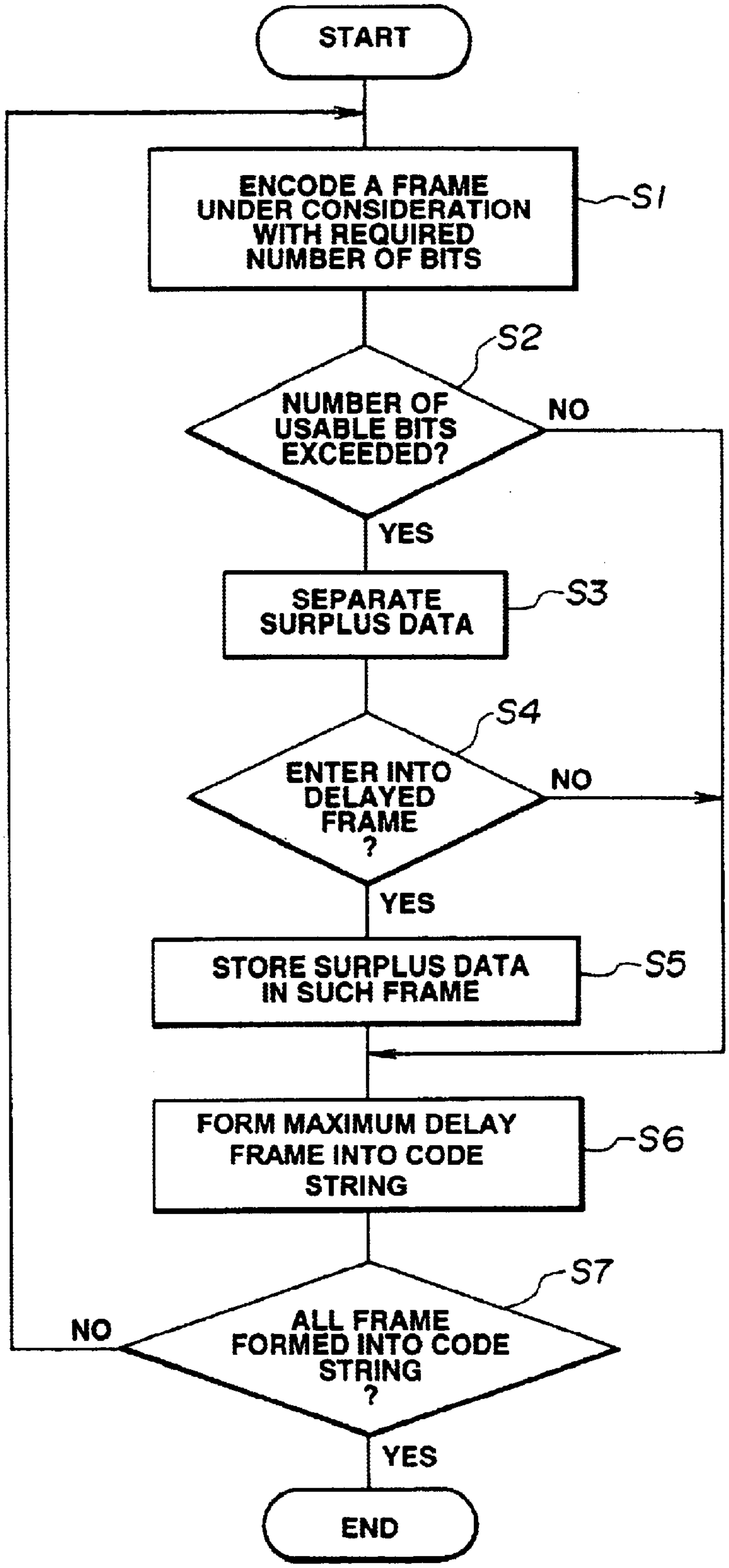
FIG. 13 is flow chart for illustrating the processing flow for allowing for delay during encoding.

FIG. 13 shows the processing flow when the delay is allowed at the time of encoding.

Referring to FIG. 13, the number of bits required for obtaining the sound quality required for a frame under consideration is found and encoded at step S1. At the next step S2, it is determined whether or not the number of required bits has exceeded the fixed usable number of bits. If it is found that the fixed usable number of bits has not been exceeded, the program transfers to step S6. If it is found that the fixed usable number of bits has been exceeded, the program transfers to step S3.

At step S3, the surplus data is separated, before the program transfers to step S4, where it is determined whether or not the surplus data can be stored in a delayed frame. It is found at step S4 that the surplus data cannot be stored, the program transfers to step S6 and, if otherwise, to step S5.

At step S5, the surplus data is stored in the storable frame, before the program transfers to step S6.

At step S6, the maximum delay frame is formed into a code string. At the next step S7, it is judged whether or not all frames have been formed into code strings. If it is found at step S7 that the process of forming all frames into code strings has not come to a close, the program transfers to step S1 to repeat the processing as from the step S1. If it is found that the process of forming all frames into a code string is terminated, the processing comes to a close.

Figure 17:
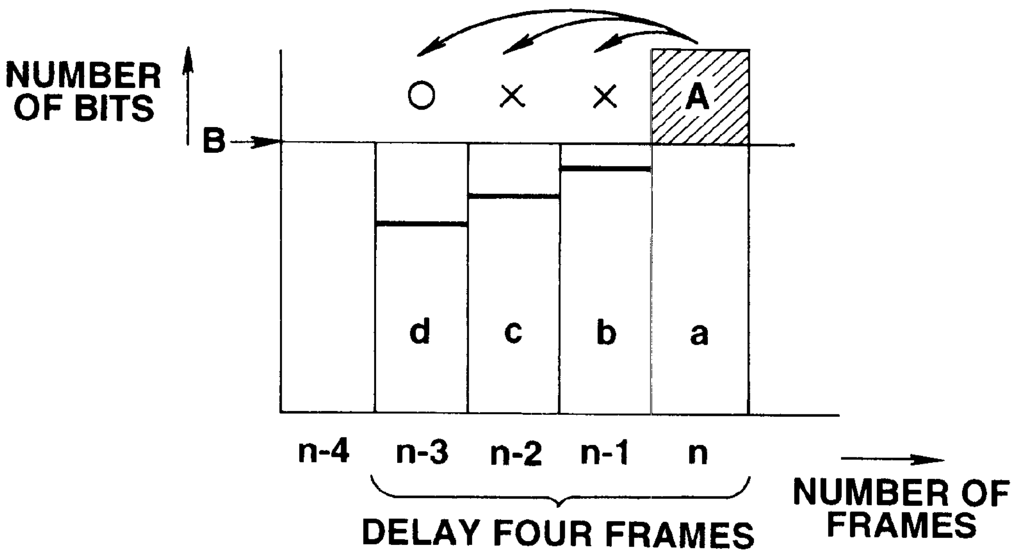
FIG. 17 illustrates the processing of FIG. 13.

An example of the processing of FIG. 13 is explained by referring to FIG. 17 showing processing with delay of four frames. In this figure, the abscissa and the ordinate show the frame number indicating time and the number of bits, respectively, with B indicating the fixed number of bits.

In FIG. 17, (n) denotes a current frame being processed, while (n−1) to (n−3) denote delayed frames and (n−4) denotes a frame already outputted. The number of required bits for each frame is denoted by a to d with data A being data of the frame (n) where the fixed number of bits is exceeded. In the present example, if the frame in which the data A of the frame (n) where the fixed number of bits is exceeded is searched, beginning from the frame (n−1), it is found that the frame (n−3) is capable of storing the data. Thus the data A of the surplus bits of the frame (n) is introduced into the frame (n−3) to form a code string by way of an encoding operation. Although the data A of the surplus bits is handled as a lumped data, it can be separated and stored in plural frames if the data A is separable.

Figure 14:
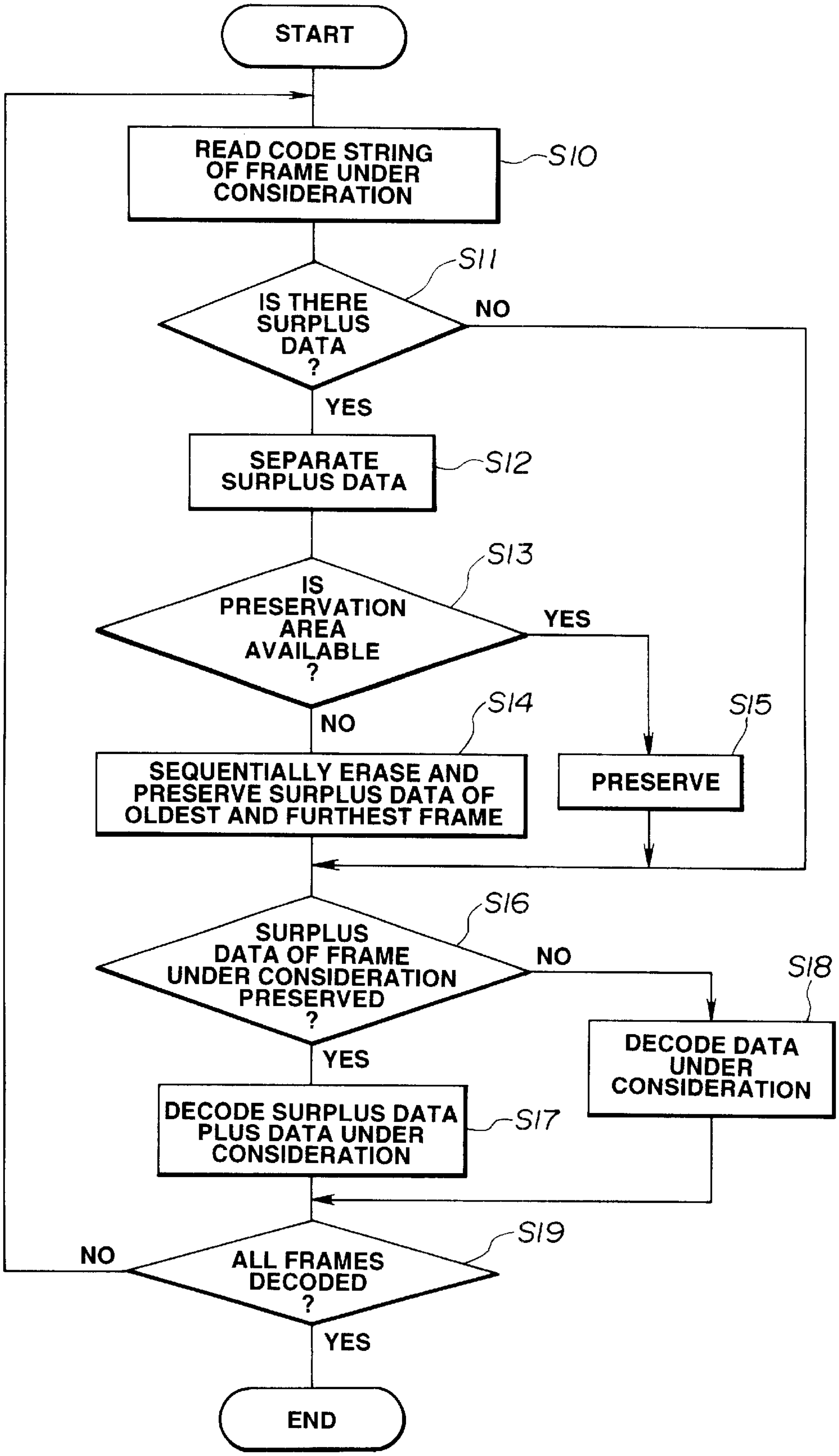
FIG. 14 is a flow chart showing the processing flow for decoding a code string obtained on encoding by flow chart processing of FIG. 13.

FIG. 14 shows the processing flow in case a code string encoded by the processing of FIG. 13 is to be decoded.

Referring to FIG. 14, the code string of the frame under consideration is read at step S10. At the next step S11, it is determined whether or not the surplus data is contained in the frame. If it is found that the surplus data is not contained, the program transfers to step S16 and, if otherwise, to step S12.

At step S12, the surplus data is separated and, at the next step S13, it is determined whether or not there is any area capable of storing the surplus data. If it is found at step S13 that there is any area, the surplus data is stored at step S15 before the program transfers to step S16. If it is found at step S13 that there is no area, the program transfers to step S14.

At step S14, surplus data of the oldest or furthest frame is sequentially erased until the surplus data is preserved. The program then transfers to step S16.

At step S16, it is determined whether or not the surplus data for the frame under consideration has been preserved. If it is found that the surplus data is not preserved, the program transfers to step S18 and, if otherwise, to step S17.

At step S18, the data is decoded. At step S17, the surplus data and the data of the frame under consideration are combined together and decoded.

Subsequently, at step S19, it is determined whether or not all frames have been decoded. If it is found that all frames have not been decoded, the program transfers to step S10 in order to repeat the subsequent processing. If otherwise, the processing comes to a close.

In this case, it is unnecessary to effect delaying during decoding.

Figure 18:
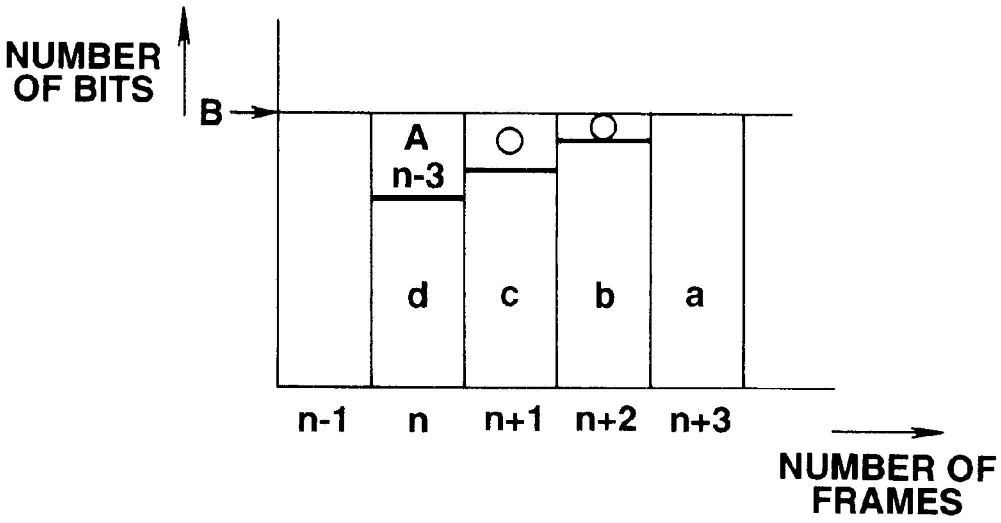
FIG. 18 illustrates the processing of FIG. 14.

An illustrative example of the processing of FIG. 14 is explained by referring to FIG. 18 in which the abscissa and the ordinate represent the frame number and the number of bits, respectively, with B indicating the fixed number of bits.

Referring to FIG. 18, (n) denotes a frame currently processed and (n+1) ff. denotes frames to be processed, with (n−1) indicating a frame already processed. Since the current frame (n) contains data A of the frame (n+3), as shown in FIG. 17, it is preserved until the time of processing the frame (n+3), while the data d of the current frame (n) is decoded. For processing the frame (n+3), the surplus data A read and held at the time of processing of the frame (n) and the data a for the frame (n+3) are combined together for decoding.

Figure 15:
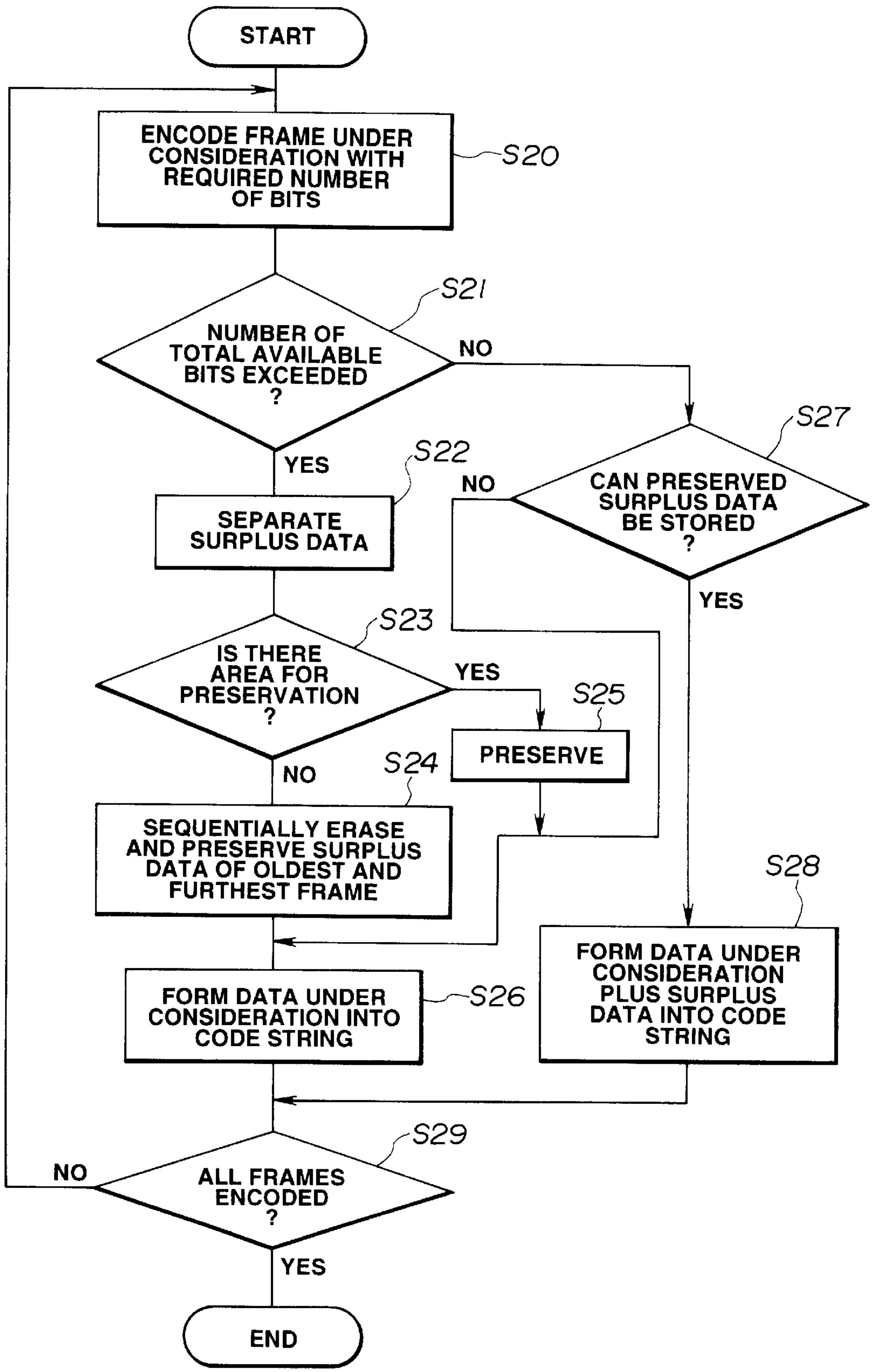
FIG. 15 is a flow chart showing the processing flow in case delay is not required for encoding.

FIG. 15 shows processing flow for the case wherein there is no necessity of delaying the frame during encoding.

Referring to FIG. 15, the number of bits required for producing the required sound quality for a frame under consideration is found and encoded. At the next step S21, it is judged whether or not the required number of bits has surpassed the usable fixed number of bits. If it is found the required number of bits has not surpassed the usable fixed number of bits, the program transfers to step S27 and, if otherwise, to step S22.

At step S22, the surplus data is separated. At the next step S23, it is determined whether or not there is any area for preserving the surplus data. If it is found that there is any such area, the program transfers to step S25 where the surplus data is stored before the program transfers to step S26. If it is found at step S23 that there is no such area, the program transfers to step S24. At step S24, the preserved surplus data of the oldest or furthest frame is sequentially erased until the surplus is preserved.

At step S27, to which the program transfers when it is determined that the required number of bits has surpassed the usable fixed number of bits, it is determined whether or not the data inclusive of the preserved surplus data can be stored. If it is found at step S27 that the data inclusive of the preserved surplus data can be stored, the program transfers to step S28 where the data and the surplus data are formed into a code string before the program transfers to step S29. If otherwise, the program transfers to step S26.

At step S26, the data is formed into a code string. At the next step S29, it is judged whether or not all frames have been formed into code strings. If it is found at step S29 that all frames have not been formed into code strings, the program reverts to step S20 to repeat the processing described above. If otherwise, the processing comes to a close.

Figure 19:
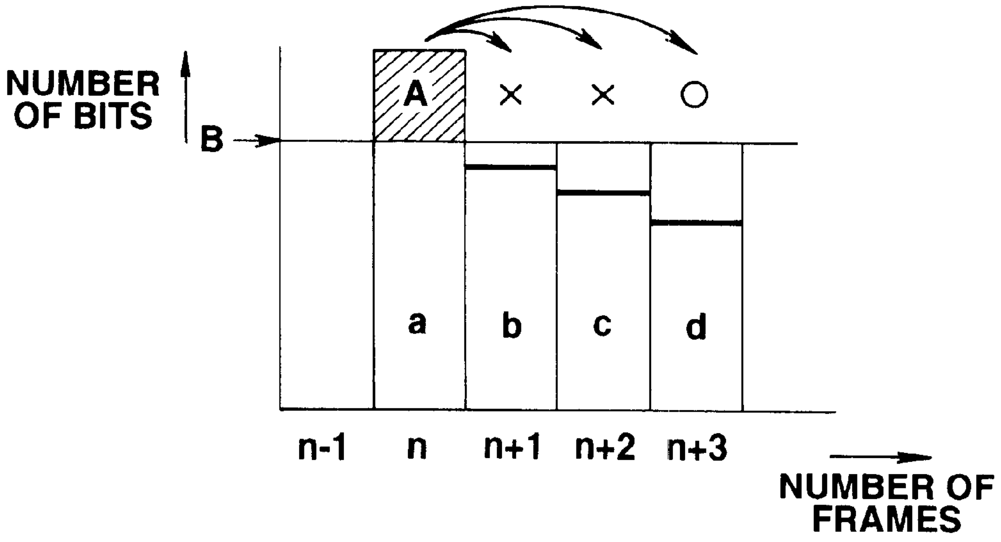
FIG. 19 illustrates the processing of FIG. 15.

An example of the processing of FIG. 15 is explained by referring to FIG. 19 showing processing with delay of four frames. In this figure, the abscissa and the ordinate show the frame number indicating time and the number of bits, respectively, with B indicating the fixed number of bits.

In FIG. 19, (n) denotes a current frame being processed, while (n+1) ff. denote frames to be processed and (n−1) denotes a frame already processed. The data A which has surpassed the fixed number of bits of the frame under consideration (n) is stored in the memory circuit 59, while data a is encoded. When encoding subsequent frames, it is determined whether or not the surplus data A can be entered into the frames. If it is found that the surplus data cannot be entered, only data of the frame is encoded. In the present example, the surplus data read at the time of processing the frame (n) can be stored when processing the frame (n+3). In the present example, the surplus data A of the frame (n) is entered into the frame (n+3) by way of encoding.

Although the data A of the surplus bits is handled as a lumped data, it can be separated and stored in plural frames if the data A is separable.

Figure 16:
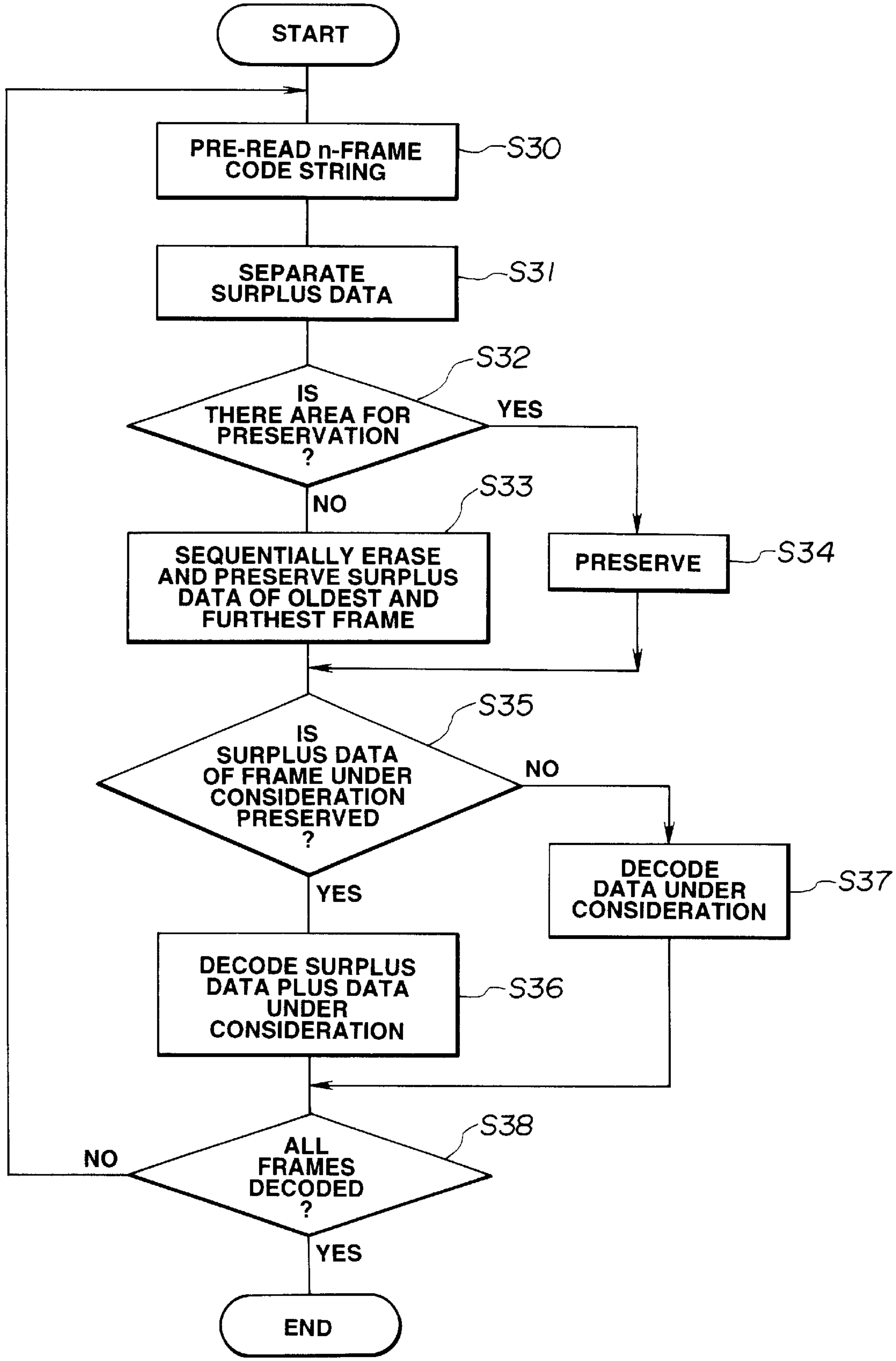
FIG. 16 is a flow chart showing the processing flow in case a code string produced by the flow chart of FIG. 15 is pre-read and decoded.

FIG. 16 shows the processing flow when pre-reading the code string encoded by the processing shown in the flow chart of FIG. 15.

In FIG. 16, n-frame data is pre-read at step S30, and surplus data is separated at step S31. At the next step S32, it is determined whether there is any area for preserving the surplus data. If it is found that there is any such data, the program transfers to step S34 where the surplus data is stored. The program then transfers to step S35.

At step S32, surplus data of the oldest or furthest frame is sequentially erased until the surplus data is preserved at step S33. The program then transfers to step S35.

At step S35, it is judged whether or not the surplus data of the frame under consideration has been preserved. If it is found that the surplus data has not been preserved, the program transfers to step S37 for decoding the frame data. The program then proceeds to step S38.

If it is found at step S5 that the surplus data has been preserved, the program transfers to step S36. At step S36, the frame data and the surplus data are combined by way of decoding. The program then transfers to step S38.

At step S38, it is determined whether or not all frames have been decoded. If it is found that all frames have not been decoded, the program reverts to step S30 to repeat the process described above. If otherwise, the processing comes to a close.

Figure 20:
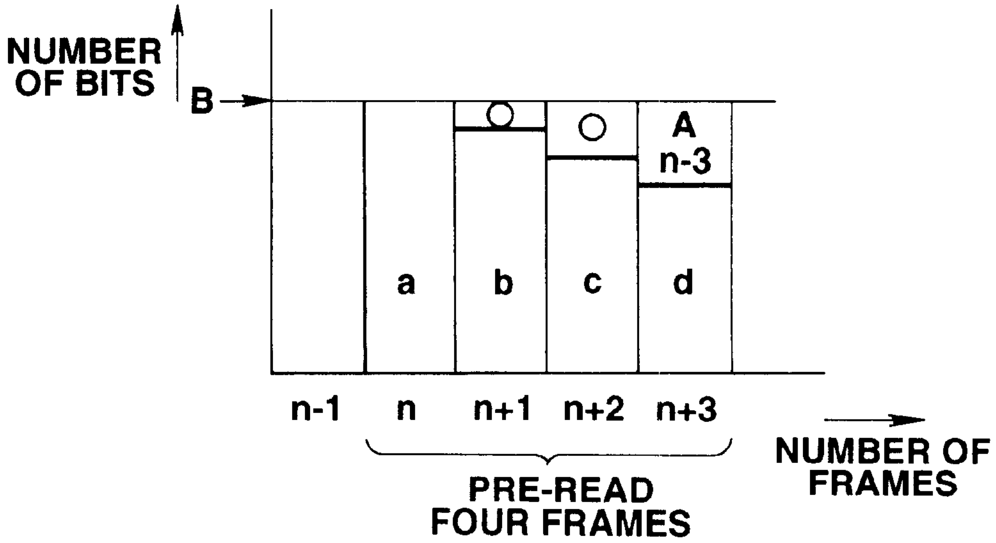
FIG. 20 illustrates the processing of FIG. 16.

An example of processing of FIG. 16 is explained by referring to FIG. 20 showing an example of pre-reading four frames. In this figure, the abscissa and the ordinate show the frame number indicating time and the number of bits, respectively, with B indicating the fixed number of bits.

In FIG. 20, (n) denotes a current frame being processed, while (n+1) to (n+3) denote pre-read frames and (n−1) denotes a frame already outputted. The required number of bits of each frame is represented as a to d while the data of the bits of the frame having surplus data (n−3) is represented as A. It is determined whether or not the surplus data of the current frame (n) has entered the pre-read other frames. Since the data A has been entered in the frame (n+3), the processing of the frame (n) is carried out simultaneously with data A by way of decoding and outputting.

Figure 21:
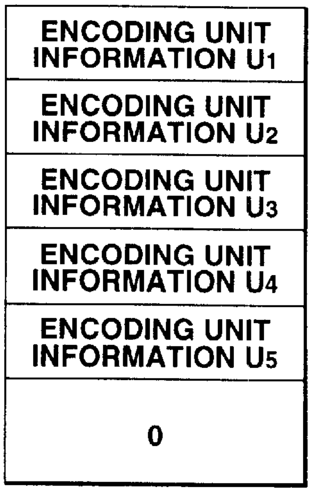
FIG. 21 illustrates an example of a code string generated by the information encoding method of the present invention.
Figure 22:
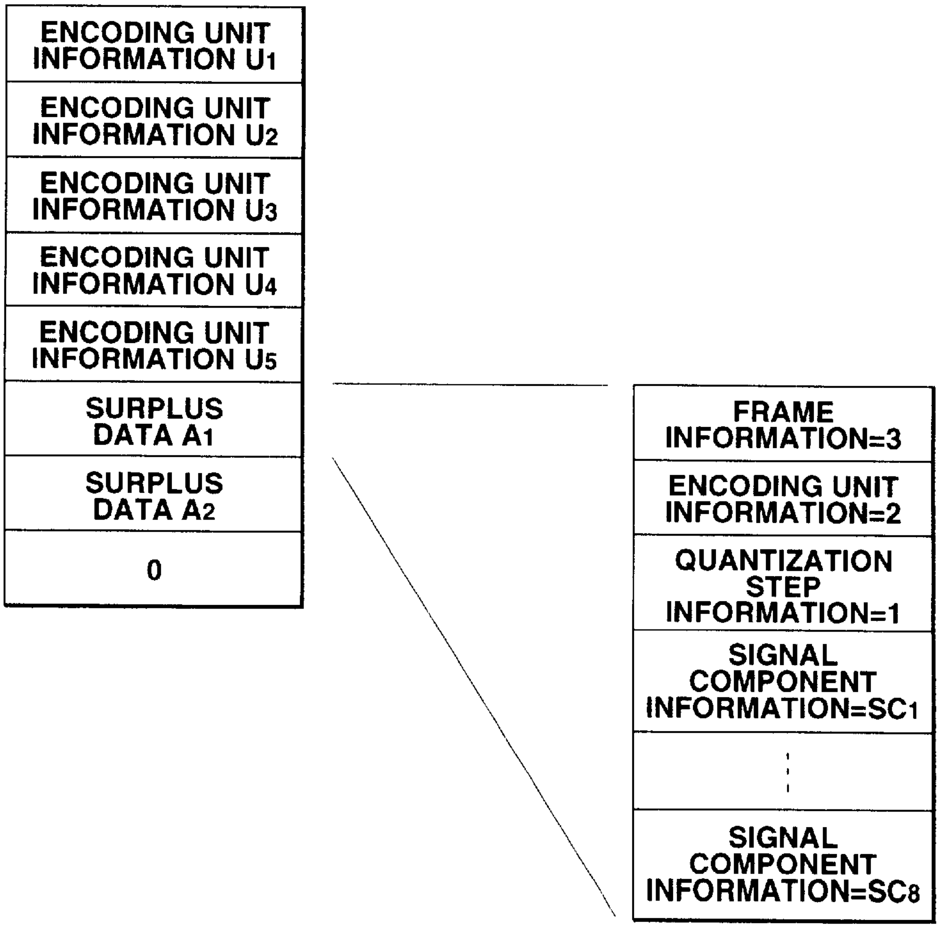
FIG. 22 illustrates an example of a surplus data containing code string generated by the information encoding method of the present invention.

FIGS. 21 and 22 show examples of code strings generated by the encoding method or apparatus of the present invention.

FIG. 21 shows an example of a code string in case there is any redundant bit at the time of quantization. In FIG. 21, five encoding units of the information data $U_1$ to $U_5$ followed by zero data are arrayed in the code string, with the number of zero data making up the fixed number of bits along with the information data $U_1$ to $U_5$. This indicates that there is no surplus data which can be stored in the frame. The inner construction of the encoding units $U_1$ to $U_5$ is not explained herein since it is the same as that of the prior-art example. These encoding units $U_1$ to $U_5$ and the zero data are recorded on a recording medium of the present invention, such as a magneto-optical medium.

FIG. 22 shows an example of a code string containing surplus data. In this figure, there are arrayed five encoding units of the information data $U_1$ to $U_5$ followed by two surplus data $A_1$ and $A_2$ and zero data. In the surplus data $A_1$, $A_2$, there are contained the frame information indicating to which frame the surplus data belongs, the encoding unit information indicating to which encoding unit the frame belongs, and the quantization step information, along with the separated signal component information data $SC_1$ to $SC_8$. It is these encoding units $U_1$ to $U_5$, surplus data $A_1$ and $A_2$ and the zero data that are recorded on the recording medium, such as the magneto-optical disc.

The recording medium of the present invention may encompass tape-shaped recording medium, such as a magnetic tape or motion picture film or an IC card, in addition to disc-shaped recording media, such as a magneto-optical disc, phase transition disc or a magnetic disc.

What is claimed is:

1. A method of encoding information of an input signal using a fixed number of bits for each unit time frame, wherein the improvement resides in that a part of the encoded information of at least one second frame temporarily consecutively or non-consecutively preceding or following the first frame is contained in the encoded information of said first frame, wherein said part comprises a variable number of bits, and the encoded information of said first frame is determined independent of the encoded information of the at least one second frame.

2. The method of claim 1, wherein information indicating said second frame is contained in said part of the encoded information.

3. The method of claim 1, wherein said part of the encoded information is surplus data which would surpass a pre-set fixed number of bits for the second frame if the input signal for the second frame were encoded using a number of bits which would be required for realizing a required quality of decoded signals obtained on decoding the encoded information for the second frame.

4. The method of claim 3, wherein said part of the encoded information is divided and contained in said first frame.

5. The method of claim 4, wherein said part of the encoded information is such data in the absence of which the encoded information of the second frame can at least be decoded.

6. The method of claim 1, wherein the encoded information of plural frames encoded using a number of bits necessary for producing the decoded signals of a required quality is preserved, and wherein, if, when the input signal of each frame is encoded using the necessary number of bits, there is produced surplus data exceeding the fixed number of bits for each frame, said plural frames are searched and said first frame capable of storing the encoded information in which the surplus data can be stored is found, said surplus data being formed in a code string by being contained in the encoded information of the first frame in which the surplus data can be stored.

7. The method of claim 1, wherein the input signal of a frame is encoded using a number of bits required for realizing a required quality of decoded signal, wherein, if, when the input signal of the frame is encoded using the required number of bits, surplus data is produced which surpasses the fixed number of bits of the frame, said surplus data is preserved, and wherein, if the required number of bits is less than the fixed number of bits of the frame, it is judged whether or not preserved surplus data in the past can be stored in the frame, and if the preserved surplus data in the past can be stored, said preserved surplus data is included in the encoding information of the frame and formed into a code string as said part of the encoding information.

8. A method of decoding encoded information in which a code string produced using a fixed number of bits for each unit time frame is decoded, wherein the improvement resides in that a code string in which a part of the encoded information of at least one second frame temporally consecutively or non-consecutively preceding or following a first frame is contained in the encoded information of said first frame is decoded, wherein said part comprises a variable number of bits, and the encoded information of said first frame is decoded independent of the encoded information of the at least one second frame.

9. The method of claim 8, wherein if said part of the encoded information represents surplus data exceeding the fixed number of bits of the second frame when a signal of the second frame is encoded using a number of bits required for obtaining a required quality of signal decoded from the encoded information of the second frame, and if a code string in which surplus data of an arbitrary second frame is contained in the encoded information of a first frame temporally posterior to said second frame is to be decoded, the surplus data contained in said first frame is separated and preserved, and wherein if the surplus data of the second frame is in the surplus data preserved so far, both surplus data are decoded.

10. The method of claim 8, wherein said part of the encoded information is preserved and, if, when preserving said part of the encoded information, a recording capacity for preserving said part of the encoded information is exceeded, a part of the encoded information of a frame older in the preserving sequence or further from a current frame is sequentially erased and a part of the encoded information of the current frame is preserved.

11. The method of claim 8, wherein if said part of the encoded information represents surplus data exceeding the fixed number of bits of the second frame when a signal of the second frame is encoded using a number of bits required for obtaining a required quality of signal decoded from the encoded information of the second frame, and if a code string in which surplus data of an arbitrary second frame is contained in the encoded information of a first frame temporally previous to said second frame is to be decoded, a code string of a pre-set number of framers is taken out, and if the surplus data of the second frame is contained in the code string of the pre-set number of frames, said surplus data is also decoded.

12. An apparatus for encoding an input signal to form encoded information using a fixed number of bits for each unit time frame, comprising:

means for separating a part of the encoded information of at least one second frame temporally consecutively or non-consecutively preceding or following a first frame; and synthesizing means for incorporating said part of the encoded information separated by said separating means into the encoded information of said first frame, wherein said part comprises a variable number of bits, and the encoded information of said first frame is determined independent of the encoded information of the at least one second frame.

13. The apparatus of claim 12, wherein said separating means incorporates the information representing the second frame in said part of the encoded information.

14. The apparatus of claim 13, wherein said part of the encoded information is surplus data which would surpass a pre-set fixed number of bits for the second frame if the input signal for the second frame were encoded using a number of bits which would be required for realizing a required quality of decoded signals obtained on decoding the encoded information for the second frame.

15. The apparatus of claim 14, wherein said separating means subdivides said part of the encoded information and wherein said synthesizing means incorporates the subdivided portions of said part of the encoded information in a plurality of first frames.

16. The apparatus of claim 15, wherein said part of the encoded information is such data in the absence of which at least the encoded information of the second frame can be decode.

17. The apparatus of claim 12, wherein said synthesizing means comprises:

means for preserving the encoded information of plural frames encoded using a number of bits necessary for producing decoded signals of a required quality;

means for discriminating such first frame among said plural frames preserving the encoded information in which surplus data exceeding the fixed number of bits for each frame can be stored as said part of the encoded information if, when the input signal of each frame is encoded using the necessary number of bits, there is producing such surplus data; and means for generating a code string comprising the encoding information of a first frame capable of storing the surplus data and the surplus data contained in the first frame.

18. The apparatus of claim 12, further comprising:

encoding means for encoding the input signal of a frame using a number of bits required for realizing a required quality of decoded signal, wherein said synthesizing means has preserving means for preserving surplus data which surpasses the fixed number of bits of the frame if, when the input signal of the frame is encoded using the required number of bits, said surplus data is produced, means for judging whether preserved surplus data in the past can be stored in a frame if the required number of bits is less than the fixed number of bits of the frame, and means for incorporating said surplus data as said part of the encoded information in a frame found to be capable of storing the surplus data for forming a code string.

19. An apparatus for decoding encoded information in which a code string produced using a fixed number of bits for each unit time frame is decoded, wherein the improvement resides in that a code string in which a part of the encoded information of at least one second frame temporally consecutively or non-consecutively preceding or following a first frame is contained in the encoded information of said first frame is decoded, wherein said part comprises a variable number of bits, and the encoded information of said first frame is decoded independent of the encoded information of the at least one second frame.

20. The apparatus of claim 19, comprising:

separating means for separating surplus data contained in said first frame if said part of the encoded information represents surplus data exceeding the fixed number of bits of the second frame when the signal of the second frame is encoded using a number of bits required for obtaining a required quality of signal decoded from the encoded information of the second frame, and if a code string in which surplus data of an arbitrary second frame is contained in the encoded information of a first frame temporally posterior to said second frame is to be decoded, means for preserving the separated surplus data, synthesizing means for synthesizing surplus data of said second frame, if any, present in the sure plus data preserved thus far, and decoding means for decoding the synthesized encoded information.

21. The apparatus of claim 19, comprising preservation control means for controlling said means for preserving, wherein, if a recording capacity for holding said part of the encoded information is exceeded when preserving said part of the encoded information, a part of the encoded information of a frame older in a preserving sequence or further from a current frame is sequentially erased and a part of the encoded information of the current frame is preserved.

22. The apparatus of claim 19, comprising:

means for taking out a code string of a pre-set number of frames if said part of the encoded information represents surplus data exceeding the fixed number of bits of the second frame when the signal of the second frame is encoded using a number of bits required for obtaining a required quality of signal decoded from the encoded information of the second frame, and if a code string in which surplus data of an arbitrary second frame is contained in the encoded information of a first frame temporally previous to said second frame is to be decoded;

synthesizing means for synthesizing surplus data of said second frame, if any, present in the code string of the pre-set number of frames; and decoding means for decoding the synthesized encoded information.

23. A recording medium for encoding information encoded from an input signal using a fixed number of bits for each unit time frame, wherein the improvement resides in that a code string in which a part of the encoded information of at least one second frame temporally consecutively or non-consecutively preceding or following a first frame is contained in the encoded information of said first frame is recorded thereon, wherein said part comprises a variable number of bits, and the encoded information of said first frame is determined independent of the encoded information of the at least one second frame.

24. The recording medium as claimed in claim 23, wherein said code string comprises surplus data which would surpass a pre-set fixed number of bits for the second frame if the input signal for the second frame were encoded using a number of bits which would be required for realizing a required signal quality obtained on decoding the encoded information for the second frame, and wherein the surplus data of an arbitrary second frame is contained in the encoded information of a frame temporally posterior to the first frame.

25. The recording medium as claimed in claim 23, wherein said code string comprises surplus data which would surpass a pre-set fixed number of bits for the second frame if the input signal for the second frame were encoded using a number of bits which would be required for realizing a required signal quality obtained on decoding the encoded information for the second frame, and wherein the surplus data of an arbitrary second frame is contained in the encoded information of a frame temporally anterior to the first frame.

26. The method of claim 1, wherein said second frame precedes said first frame.

27. The method of claim 1, wherein said at least one second frame comprises two or more second frames.

28. The method of claim 8, wherein said second frame precedes said first frame.

29. The method of claim 8, wherein said at least one second frame comprises two or more second frames.

30. The apparatus of claim 12, wherein said second frame precedes said first frame.

31. The apparatus of claim 12, wherein said at least one second frame comprises two or more second frames.

32. The apparatus of claim 19, wherein said second frame precedes said first frame.

33. The apparatus of claim 19, wherein said at least one second frame comprises two or more second frames.

34. The recording medium of claim 23, wherein said second frame precedes said first frame.

35. The recording medium of claim 23, wherein said at least one second frame comprises two or more second frames.

* * * * *